United States Patent
Eronen et al.

(10) Patent No.: US 11,367,280 B2
(45) Date of Patent: Jun. 21, 2022

(54) AUDIO PROCESSING FOR OBJECTS WITHIN A VIRTUAL SPACE

(71) Applicant: Nokia Technologies Oy, Espoo (FI)

(72) Inventors: Antti Eronen, Tampere (FI); Arto Lehtiniemi, Lempäälä (FI); Jussi Leppänen, Tampere (FI); Juha Arrasvuori, Tampere (FI)

(73) Assignee: Nokia Technologies Oy, Espoo (FI)

( * ) Notice: Subject to any disclaimer, the term of this patent is extended or adjusted under 35 U.S.C. 154(b) by 296 days.

(21) Appl. No.: 16/488,709

(22) PCT Filed: Feb. 26, 2018

(86) PCT No.: PCT/FI2018/050137
§ 371 (c)(1),
(2) Date: Aug. 26, 2019

(87) PCT Pub. No.: WO2018/158499
PCT Pub. Date: Sep. 7, 2018

(65) Prior Publication Data
US 2020/0042792 A1    Feb. 6, 2020

(30) Foreign Application Priority Data

Mar. 2, 2017  (EP) ..................... 17158876

(51) Int. Cl.
*G06K 9/00* (2022.01)
*G06V 20/20* (2022.01)
(Continued)

(52) U.S. Cl.
CPC .............. *G06V 20/20* (2022.01); *G06F 3/011* (2013.01); *G06F 3/04815* (2013.01);
(Continued)

(58) Field of Classification Search
CPC ....... G06K 9/00671; G06T 7/75; G06T 15/10; G06T 19/006; G06F 16/5866;
(Continued)

(56) References Cited

U.S. PATENT DOCUMENTS 6,850,496 B1 * 2/2005 Knappe ................... H04M 3/56
370/260
2004/0234076 A1   11/2004 Agostini
(Continued)

FOREIGN PATENT DOCUMENTS

EP       2811464 A1    12/2014

OTHER PUBLICATIONS

Shah et al., "Metrics for Measuring Ideation Effectiveness", Design Studies, 2003, pp. 111-134.
(Continued)

*Primary Examiner* — Terrell M Robinson
(74) *Attorney, Agent, or Firm* — Harrington & Smith

(57) ABSTRACT

A method comprising: dividing a virtual space using virtual partitions that affect perception of the virtual space by a user within the virtual space; in response to a first action in the virtual space relative to a first virtual partition by a user making a first change to how the first virtual partition affects the virtual space perceived by the user.

20 Claims, 9 Drawing Sheets

(51) Int. Cl.
| | |
|---|---|
| G06T 7/73 | (2017.01) |
| G06F 16/58 | (2019.01) |
| G06F 3/01 | (2006.01) |
| G06F 3/04815 | (2022.01) |
| G06F 3/16 | (2006.01) |
| G06T 15/10 | (2011.01) |
| G06T 19/00 | (2011.01) |
| H04S 1/00 | (2006.01) |

(52) U.S. Cl.
CPC .......... G06F 3/167 (2013.01); G06F 16/5866 (2019.01); G06T 7/75 (2017.01); G06T 15/10 (2013.01); G06T 19/006 (2013.01); H04S 1/002 (2013.01); H04S 2400/00 (2013.01)

(58) Field of Classification Search
CPC ...... G06F 3/011; G06F 3/04815; G06F 3/167; H04S 1/002; H04S 2400/00
See application file for complete search history.

(56) References Cited

U.S. PATENT DOCUMENTS

| | | | | |
|---|---|---|---|---|
| 2009/0285407 | A1* | 11/2009 | Cragun | G06T 19/00 381/61 |
| 2013/0198625 | A1* | 8/2013 | Anderson | G06F 3/016 715/701 |
| 2014/0133681 | A1* | 5/2014 | Mizuta | A63F 13/54 381/300 |
| 2014/0188669 | A1* | 7/2014 | Freeman | G06Q 30/0643 705/27.2 |
| 2016/0034248 | A1* | 2/2016 | Schissler | H04R 27/00 381/17 |
| 2018/0046431 | A1* | 2/2018 | Thagadur Shivappa | G06F 3/012 |

OTHER PUBLICATIONS

Smith, "Idea-Generation Techniques: A Formulary of Active Ingredients", Journal of Creative Behavior, vol. 32, No. 2, 1998, pp. 107-133.

Smith, "Towards a Logic of Innovation", The International Handbook on Innovation, 2003, pp. 347-365.

Extended European Search Report received for corresponding European Patent Application No. 17158876.7, dated Jul. 26, 2017, 8 pages.

International Search Report and Written Opinion received for corresponding Patent Cooperation Treaty Application No. PCT/FI2018/050137, dated May 16, 2018, 11 pages.

Office action received for corresponding European Patent Application No. 17158876.7, dated Dec. 15, 2020, 4 pages.

* cited by examiner

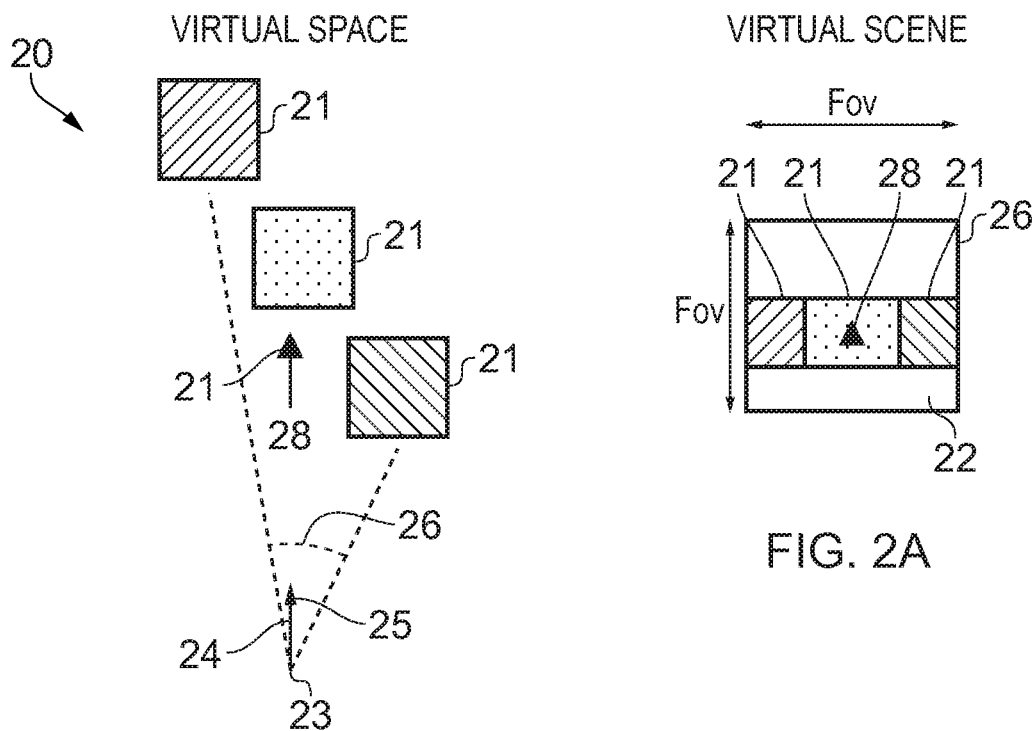
FIG. 1A
FIG. 2A
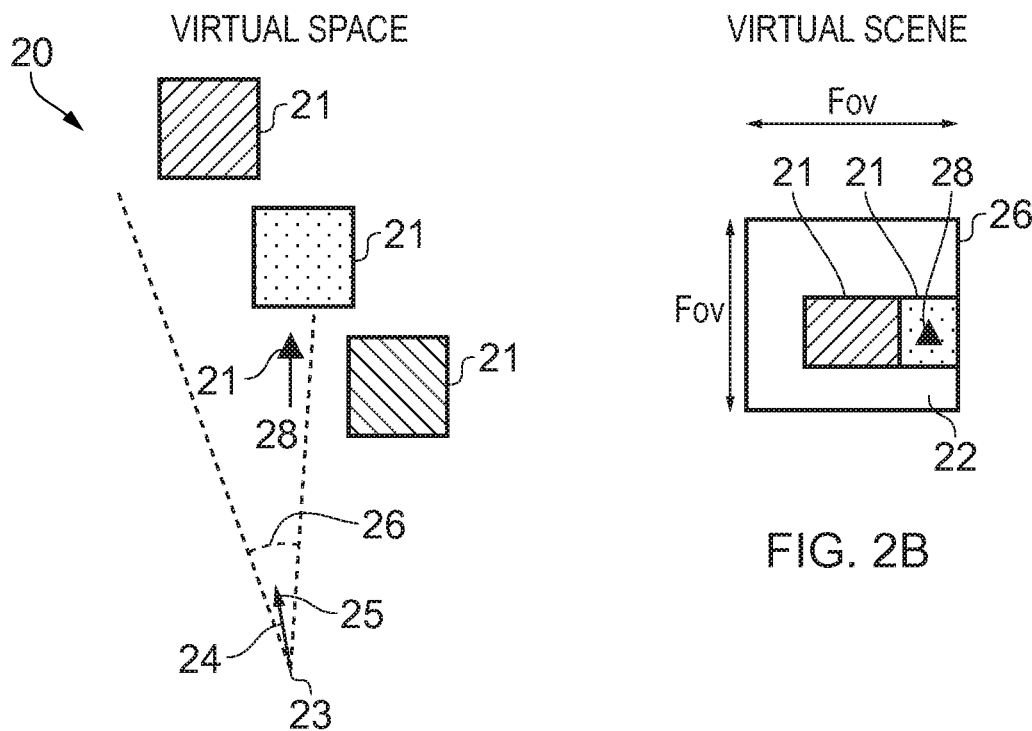
FIG. 1B
FIG. 2B

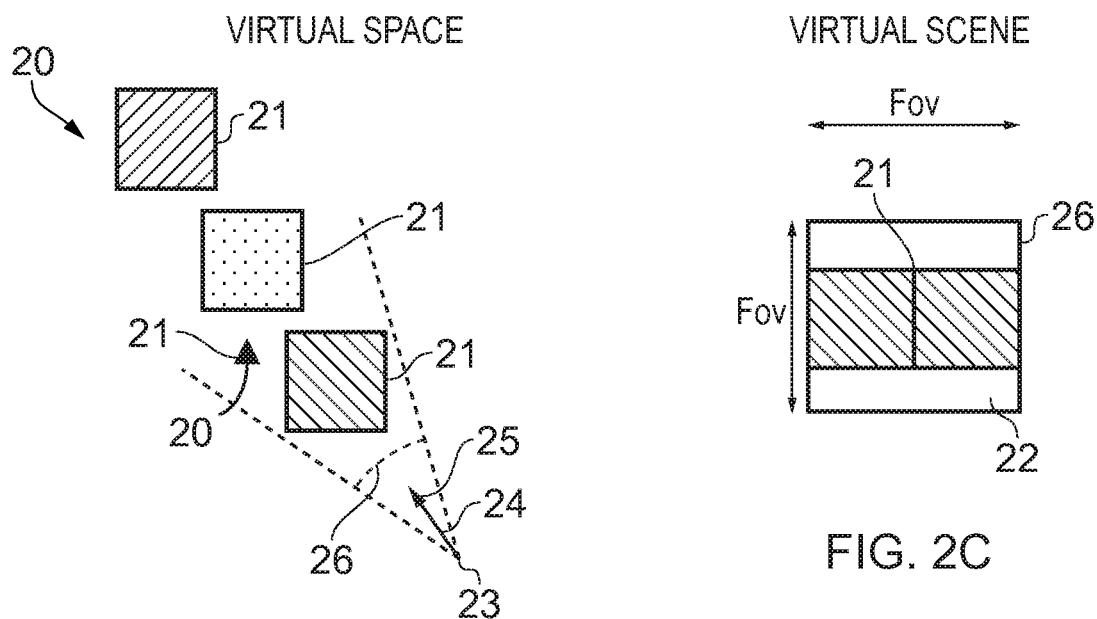
FIG. 1C
FIG. 2C
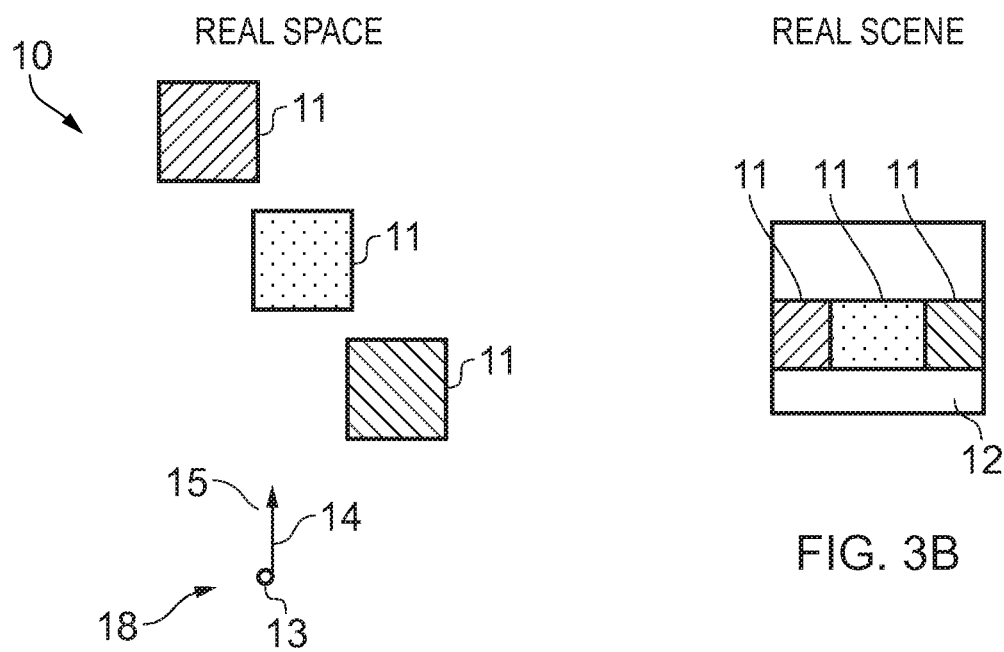
FIG. 3A
FIG. 3B

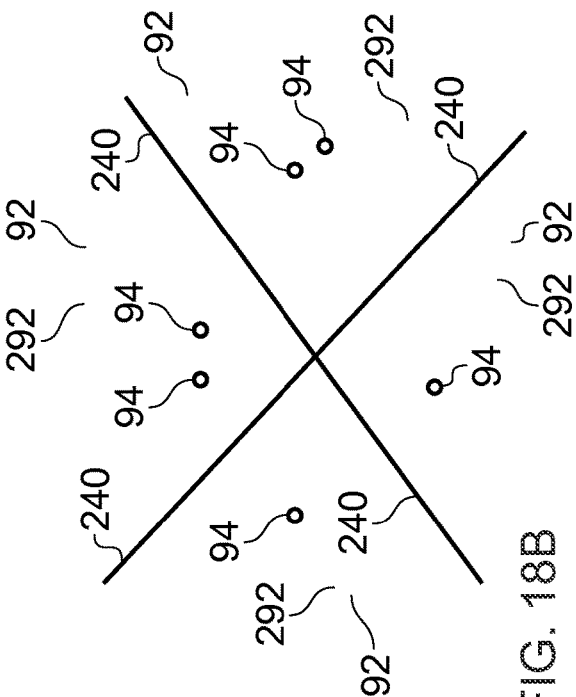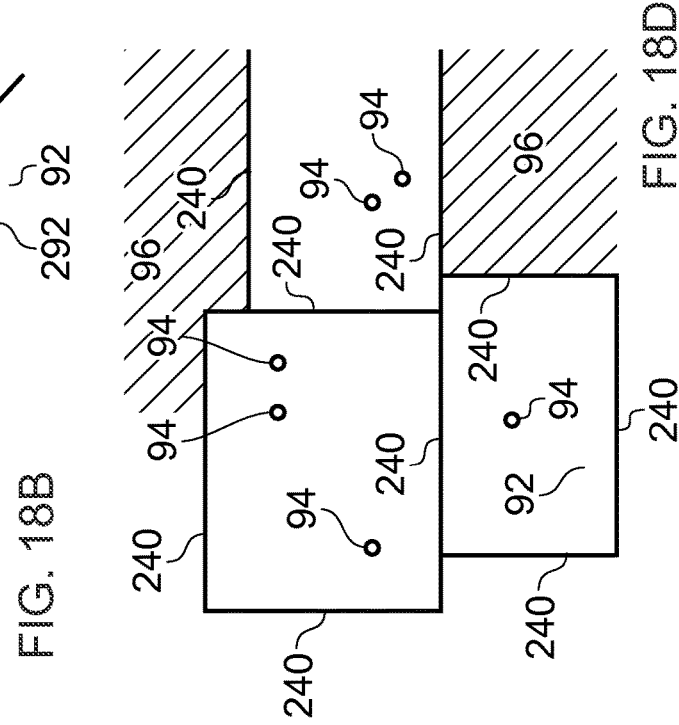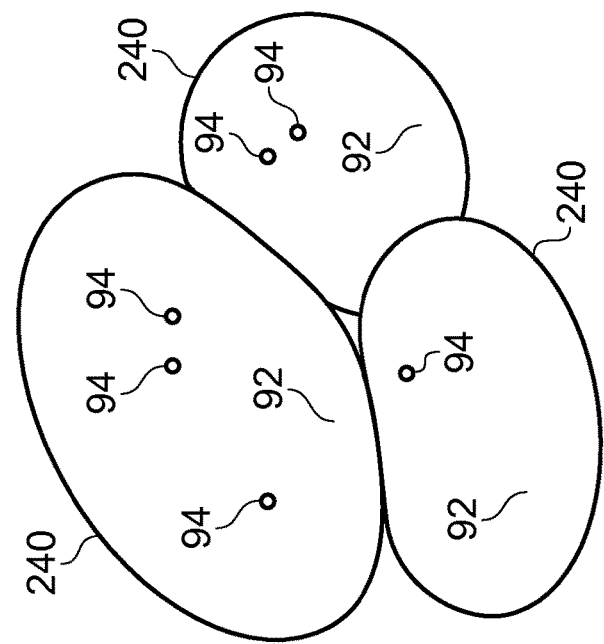

AUDIO PROCESSING FOR OBJECTS WITHIN A VIRTUAL SPACE

RELATED APPLICATION

This application was originally filed as Patent Cooperation Treaty Application No. PCT/FI2018/050137 filed Feb. 26, 2018 which claims priority benefit to EP Patent Application No. 17158876.7, filed Mar. 2, 2017.

TECHNOLOGICAL FIELD

Embodiments of the present invention relate to audio processing. Some but not necessarily all examples relate to automatic control of audio processing.

BACKGROUND

Spatial audio rendering comprises rendering sound scenes comprising sound sources at respective positions.

Each sound scene therefore comprises information that is processed aurally by a listener. The user will appreciate not only the presence of a sound source but also its location in the sound scene and relative to other sound sources.

The field of perception of sound is much wider that the field of perception (field of view) for sight. This may result in a significant amount of information being processed aurally by a listener.

In the context of rendered mediated reality, it is desirable to control what a user perceives both visually and aurally from a virtual space occupied by the user in dependence upon a relationship of the user to the virtual space. If a user changes this relationship, for example by changing user orientation or user position within the virtual space then what the user perceives will be changed.

BRIEF SUMMARY

According to various, but not necessarily all, embodiments of the invention there is provided a method comprising: dividing a virtual space using one or more virtual partitions that affect perception of the virtual space by a user within the virtual space;
in response to a first action in the virtual space relative to a first virtual partition by a user making a first change to how the first virtual partition affects the virtual space perceived by the user.

According to various, but not necessarily all, embodiments of the invention there is provided an apparatus comprising: at least one processor; and at least one memory including computer program code the at least one memory and the computer program code configured to, with the at least one processor, cause the apparatus at least to perform: causing division of a virtual space using one or more virtual partitions that affect perception of the virtual space by a user having a virtual position within the virtual space; in response to a first action in the virtual space relative to a first virtual partition by a real user making a first change to how the first virtual partition affects the virtual space perceived by the user.

According to various, but not necessarily all, embodiments of the invention there is provided an apparatus comprising: means for dividing a virtual space using one or more virtual partitions that affect perception of the virtual space by a user within the virtual space; means for making a first change to how the first virtual partition affects the virtual space perceived by the user, in response to a first action in the virtual space relative to a first virtual partition by a user According to various, but not necessarily all, embodiments of the invention there is provided a computer program product that when run on a processor performs: causing the apparatus at least to perform: causing division of a virtual space using one or more virtual partitions that affect perception of the virtual space by a user having a virtual position within the virtual space; causing making a first change to how the first virtual partition affects the virtual space perceived by the user, in response to a first action in the virtual space relative to a first virtual partition by a real user According to various, but not necessarily all, embodiments of the invention there is provided examples as claimed in the appended claims.

BRIEF DESCRIPTION OF FIGURES

For a better understanding of various examples that are useful for understanding the brief description, reference will now be made by way of example only to the accompanying drawings in which:

FIGS. 1A-1C and 2A-2C illustrate examples of mediated reality in which FIGS. 1A, 1B, 1C illustrate, from a common top perspective, the same virtual visual space and different points of view and FIGS. 2A, 2B, 2C illustrate a virtual visual scene from the perspective of the respective points of view;

FIG. 3A illustrates an example of a real space and FIG. 3B illustrates an example of a real visual scene;

FIG. 17A schematically illustrates an example of the audio rendered to the user before the trigger action relative to the virtual partition, FIG. 17B schematically illustrates an example of the audio rendered to the user after the trigger action relative to the virtual partition; and FIGS. 18A to 18D illustrates examples of how virtual partitions may be created and adapted.

DEFINITIONS

Figure 4:
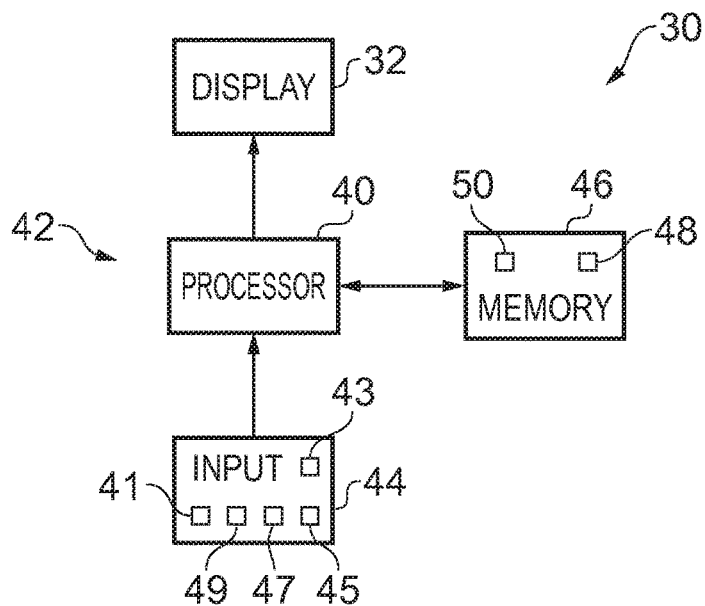
FIG. 4 illustrates an example of an apparatus that is operable to enable mediated reality and/or augmented reality and/or virtual reality.

"artificial environment" may be something that has been recorded or generated.

"virtual visual space" refers to fully or partially artificial environment that may be viewed, which may be three dimensional.

"virtual visual scene" refers to a representation of the virtual visual space viewed from a particular point of view within the virtual visual space.

'virtual visual object' is a visible virtual object within a virtual visual scene.

"real space" refers to a real environment, which may be three dimensional.

"real visual scene" refers to a representation of the real space viewed from a particular point of view within the real space.

"mediated reality" in this document refers to a user visually experiencing a fully or partially artificial environment (a virtual space) as a virtual scene at least partially rendered by an apparatus to a user. The virtual scene is determined by a point of view within the virtual space. Displaying the virtual scene means providing it in a form that can be perceived by the user.

"augmented reality" in this document refers to a form of mediated reality in which a user experiences a partially artificial environment (a virtual space) as a virtual scene comprising a real scene of a physical real world environment (real space) supplemented by one or more visual or audio elements rendered by an apparatus to a user;

"virtual reality" in this document refers to a form of mediated reality in which a user experiences a fully artificial environment (a virtual visual space) as a virtual scene displayed by an apparatus to a user;

"perspective-mediated" as applied to mediated reality, augmented reality or virtual reality means that user actions determine the point of view within the virtual space, changing the virtual scene;

"first person perspective-mediated" as applied to mediated reality, augmented reality or virtual reality means perspective mediated with the additional constraint that the user's real point of view determines the point of view within the virtual space;

"third person perspective-mediated" as applied to mediated reality, augmented reality or virtual reality means perspective mediated with the additional constraint that the user's real point of view does not determine the point of view within the virtual space;

"user interactive" as applied to mediated reality, augmented reality or virtual reality means that user actions at least partially determine what happens within the virtual space;

"displaying" means providing in a form that is perceived visually (viewed) by the user.

"rendering" means providing in a form that is perceived by the user

"sound space" refers to an arrangement of sound sources in a three-dimensional space. A sound space may be defined in relation to recording sounds (a recorded sound space) and in relation to rendering sounds (a rendered sound space).

"sound scene" refers to a representation of the sound space listened to from a particular point of view within the sound space.

"sound object" refers to sound source that may be located within the sound space. A source sound object represents a sound source within the sound space, in contrast to a sound source associated with an object in the virtual visual space. A recorded sound object represents sounds recorded at a particular microphone or position. A rendered sound object represents sounds rendered from a particular position.

"Correspondence" or "corresponding" when used in relation to a sound space and a virtual visual space means that the sound space and virtual visual space are time and space aligned, that is they are the same space at the same time.

"Correspondence" or "corresponding" when used in relation to a sound scene and a virtual visual scene (or visual scene) means that the sound space and virtual visual space (or visual scene) are corresponding and a notional listener whose point of view defines the sound scene and a notional viewer whose point of view defines the virtual visual scene (or visual scene) are at the same position and orientation, that is they have the same point of view.

"virtual space" may mean a virtual visual space, mean a sound space or mean a combination of a virtual visual space and corresponding sound space. In some examples, the virtual space may extend horizontally up to 360° and may extend vertically up to 180°

"virtual scene" may mean a virtual visual scene, mean a sound scene or mean a combination of a virtual visual scene and corresponding sound scene.

'virtual object' is an object within a virtual scene, it may be an artificial virtual object (e.g. a computer-generated virtual object) or it may be an image of a real object in a real space that is live or recorded. It may be a sound object and/or a virtual visual object.

DESCRIPTION

FIGS. 1A-1C and 2A-2C illustrate examples of mediated reality. The mediated reality may be augmented reality or virtual reality.

FIGS. 1A, 1B, 1C illustrate the same virtual visual space 20 comprising the same virtual visual objects 21, however, each Fig illustrates a different point of view 24. The position and direction of a point of view 24 can change independently. The direction but not the position of the point of view 24 changes from FIG. 1A to FIG. 1B. The direction and the position of the point of view 24 changes from FIG. 1B to FIG. 1C.

FIGS. 2A, 2B, 2C illustrate a virtual visual scene 22 from the perspective of the different points of view 24 of respective FIGS. 1A, 1B, 1C. The virtual visual scene 22 is determined by the point of view 24 within the virtual visual space 20 and a field of view 26. The virtual visual scene 22 is at least partially displayed to a user.

The virtual visual scenes 22 illustrated may be mediated reality scenes, virtual reality scenes or augmented reality scenes. A virtual reality scene displays a fully artificial virtual visual space 20. An augmented reality scene displays a partially artificial, partially real virtual visual space 20.

The mediated reality, augmented reality or virtual reality may be user interactive-mediated. In this case, user actions at least partially determine what happens within the virtual visual space 20. This may enable interaction with a virtual object 21 such as a visual element 28 within the virtual visual space 20. For example, a user may be able to select and move the virtual object 21.

The mediated reality, augmented reality or virtual reality may be perspective-mediated. In this case, user actions determine the point of view 24 within the virtual visual space 20, changing the virtual visual scene 22. For example, as illustrated in FIGS. 1A, 1B, 1C a position 23 of the point of view 24 within the virtual visual space 20 may be changed and/or a direction or orientation 25 of the point of view 24 within the virtual visual space 20 may be changed. If the virtual visual space 20 is three-dimensional, the position 23 of the point of view 24 has three degrees of freedom e.g. up/down, forward/back, left/right and the direction 25 of the point of view 24 within the virtual visual space 20 has three degrees of freedom e.g. roll, pitch, yaw. The point of view 24 may be continuously variable in position 23 and/or direction 25 and user action then changes the position and/or direction of the point of view 24 continuously. Alternatively, the point of view 24 may have discrete quantised positions 23 and/or discrete quantised directions 25 and user action switches by discretely jumping between the allowed positions 23 and/or directions 25 of the point of view 24.

FIG. 3A illustrates an example of a real space 10 comprising real objects 11 that partially corresponds with the virtual visual space 20 of FIG. 1A. In this example, each real object 11 in the real space 10 has a corresponding virtual object 21 in the virtual visual space 20, however, each virtual object 21 in the virtual visual space 20 does not have a corresponding real object 11 in the real space 10. In this example, one of the virtual objects 21, the computer-generated visual element 28, is an artificial virtual object 21 that does not have a corresponding real object 11 in the real space 10.

A linear mapping may exist between the real space 10 and the virtual visual space 20 and the same mapping exists between each real object 11 in the real space 10 and its corresponding virtual object 21. The relative relationship of the real objects 11 in the real space 10 is therefore the same as the relative relationship between the corresponding virtual objects 21 in the virtual visual space 20.

FIG. 3B illustrates an example of a real visual scene 12 that partially corresponds with the virtual visual scene 22 of FIG. 1A, it includes real objects 11 but not artificial virtual objects. The real visual scene is from a perspective corresponding to the point of view 24 in the virtual visual space 20 of FIG. 1A. The real visual scene 12 content is determined by that corresponding point of view 24 and the field of view 26 in virtual space 20 (point of view 14 in real space 10).

FIG. 2A may be an illustration of an augmented reality version of the real visual scene 12 illustrated in FIG. 3B. The virtual visual scene 22 comprises the real visual scene 12 of the real space 10 supplemented by one or more visual elements 28 displayed by an apparatus to a user. The visual elements 28 may be a computer-generated visual element. In a see-through arrangement, the virtual visual scene 22 comprises the actual real visual scene 12 which is seen through a display of the supplemental visual element(s) 28. In a see-video arrangement, the virtual visual scene 22 comprises a displayed real visual scene 12 and displayed supplemental visual element(s) 28. The displayed real visual scene 12 may be based on an image from a single point of view 24 or on multiple images from different points of view at the same time, processed to generate an image from a single point of view 24.

FIG. 4 illustrates an example of an apparatus 30 that is operable to enable mediated reality and/or augmented reality and/or virtual reality.

The apparatus 30 comprises a rendering device or devices 32, which may render information to a user visually via display, aurally via audio output and/or haptically via a haptic device. For the purposes of this example, the rendering device(s) will be described as a display.

The display 32 is for providing at least parts of the virtual visual scene 22 to a user in a form that is perceived visually by the user. The display 32 may be a visual display that provides light that displays at least parts of the virtual visual scene 22 to a user. Examples of visual displays include liquid crystal displays, organic light emitting displays, emissive, reflective, transmissive and transflective displays, direct retina projection display, near eye displays etc.

The display 32 is controlled in this example but not necessarily all examples by a controller 42.

Implementation of a controller 42 may be as controller circuitry. The controller 42 may be implemented in hardware alone, have certain aspects in software including firmware alone or can be a combination of hardware and software (including firmware).

As illustrated in FIG. 4 the controller 42 may comprise a processor 40 configured to load computer program instructions 48 from a memory 46. The controller 42 may be implemented using instructions that enable hardware functionality, for example, by using executable computer program instructions 48 in a general-purpose or special-purpose processor 40 that may be stored on a computer readable storage medium (disk, memory etc) to be executed by such a processor 40.

The processor 40 is configured to read from and write to the memory 46. The processor 40 may also comprise an output interface via which data and/or commands are output by the processor 40 and an input interface via which data and/or commands are input to the processor 40.

The memory 46 stores at least a computer program 48 comprising computer program instructions (computer program code) that controls the operation of the apparatus 30 when loaded into the processor 40. The computer program instructions, of the computer program 48, provide the logic and routines that enables the apparatus to perform at least the methods illustrated in FIGS. 5A & 5B. The processor 40 by reading the memory 46 is able to load and execute the computer program 48.

The apparatus 30 may enable user-interactive mediation for mediated reality and/or augmented reality and/or virtual reality. The user input circuitry 44 detects user actions using user input 43. These user actions are used by the controller 42 to determine what happens within the virtual visual space 20. This may enable interaction with a visual element 28 within the virtual visual space 20.

The apparatus 30 may enable perspective mediation for mediated reality and/or augmented reality and/or virtual reality. The user input circuitry 44 detects user actions. These user actions are used by the controller 42 to determine the point of view 24 within the virtual visual space 20, changing the virtual visual scene 22. The point of view 24 may be continuously variable in position and/or direction and user action changes the position and/or direction of the point of view 24. Alternatively, the point of view 24 may have discrete quantised positions and/or discrete quantised directions and user action switches by jumping to the next position and/or direction of the point of view 24.

The apparatus 30 may enable first person perspective for mediated reality, augmented reality or virtual reality. The user input circuitry 44 detects the user's real point of view 14 using user point of view sensor 45. The user's real point of view is used by the controller 42 to determine the point of view 24 within the virtual visual space 20, changing the virtual visual scene 22. Referring back to FIG. 3A, a user 18 has a real point of view 14. The real point of view may be changed by the user 18. For example, a real location 13 of the real point of view 14 is the location of the user 18 and can be changed by changing the physical location 13 of the user 18. For example, a real direction 15 of the real point of view 14 is the direction in which the user 18 is looking and can be changed by changing the real direction of the user 18. The real direction 15 may, for example, be changed by a user 18 changing an orientation of their head or view point and/or a user changing a direction of their gaze. A head-mounted apparatus 30 may be used to enable first-person perspective mediation by measuring a change in orientation of the user's head and/or a change in the user's direction of gaze.

In some but not necessarily all examples, the apparatus 30 comprises as part of the input circuitry 44 point of view sensors 45 for determining changes in the real point of view.

For example, positioning technology such as GPS, triangulation (trilateration) by transmitting to multiple receivers and/or receiving from multiple transmitters, acceleration detection and integration may be used to determine a new physical location 13 of the user 18 and real point of view 14.

For example, accelerometers, electronic gyroscopes or electronic compasses may be used to determine a change in an orientation of a user's head or view point and a consequential change in the real direction 15 of the real point of view 14.

For example, pupil tracking technology, based for example on computer vision, may be used to track movement of a user's eye or eyes and therefore determine a direction of a user's gaze and consequential changes in the real direction 15 of the real point of view 14.

The apparatus 30 may comprise as part of the input circuitry 44 image sensors 47 for imaging the real space 10.

An example of an image sensor 47 is a digital image sensor that is configured to operate as a camera. Such a camera may be operated to record static images and/or video images In some, but not necessarily all embodiments, cameras may be configured in a stereoscopic or other spatially distributed arrangement so that the real space 10 is viewed from different perspectives. This may enable the creation of a three-dimensional image and/or processing to establish depth, for example, via the parallax effect.

In some, but not necessarily all embodiments, the input circuitry 44 comprises depth sensors 49. A depth sensor 49 may comprise a transmitter and a receiver. The transmitter transmits a signal (for example, a signal a human cannot sense such as ultrasound or infrared light) and the receiver receives the reflected signal. Using a single transmitter and a single receiver some depth information may be achieved via measuring the time of flight from transmission to reception. Better resolution may be achieved by using more transmitters and/or more receivers (spatial diversity). In one example, the transmitter is configured to 'paint' the real space 10 with light, preferably invisible light such as infrared light, with a spatially dependent pattern. Detection of a certain pattern by the receiver allows the real space 10 to be spatially resolved. The distance to the spatially resolved portion of the real space 10 may be determined by time of flight and/or stereoscopy (if the receiver is in a stereoscopic position relative to the transmitter).

In some but not necessarily all embodiments, the input circuitry 44 may comprise communication circuitry 41 in addition to or as an alternative to one or more of the image sensors 47 and the depth sensors 49. Such communication circuitry 41 may communicate with one or more remote image sensors 47 in the real space 10 and/or with remote depth sensors 49 in the real space 10.

Figure 5A:
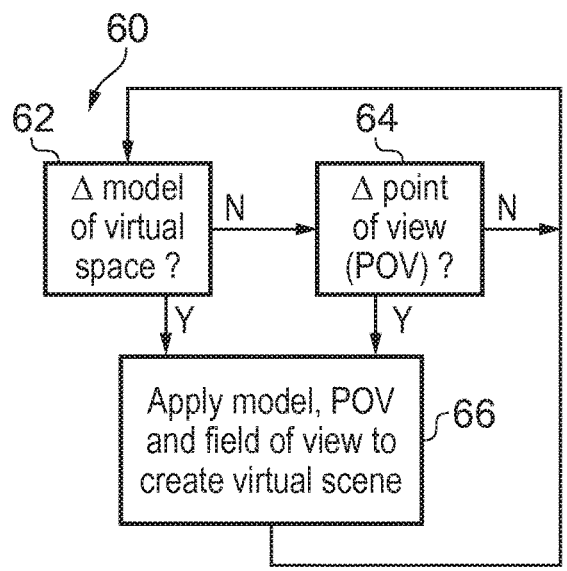
FIG. 5A illustrates an example of a method for enabling mediated reality and/or augmented reality and/or virtual reality.
Figure 5B:
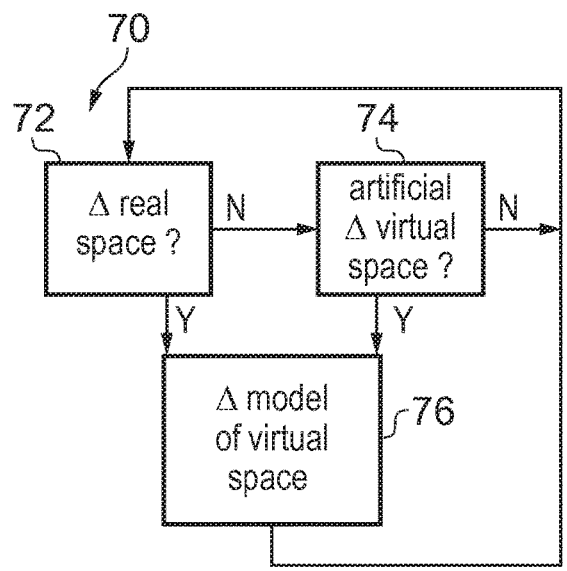
FIG. 5B illustrates an example of a method for updating a model of the virtual visual space for augmented reality.

FIG. 5B illustrates an example of a method 70 for updating a model of the virtual visual space 20 for mediated reality and/or augmented reality and/or virtual reality.

The apparatus 30 may enable mediated reality and/or augmented reality and/or virtual reality, for example using the method 60 illustrated in FIG. 5A or a similar method. The controller 42 stores and maintains a model 50 of the virtual visual space 20. The model may be provided to the controller 42 or determined by the controller 42. For example, sensors in input circuitry 44 may be used to create overlapping depth maps of the virtual visual space from different points of view and a three dimensional model may then be produced.

There are many different technologies that may be used to create a depth map. An example of a passive system, used in the Kinect™ device, is when an object is painted with a non-homogenous pattern of symbols using infrared light and the reflected light is measured using multiple cameras and then processed, using the parallax effect, to determine a position of the object.

At block 62 it is determined whether or not the model of the virtual visual space 20 has changed. If the model of the virtual visual space 20 has changed the method moves to block 66. If the model of the virtual visual space 20 has not changed the method moves to block 64.

At block 64 it is determined whether or not the point of view 24 in the virtual visual space 20 has changed. If the point of view 24 has changed the method moves to block 66. If the point of view 24 has not changed the method returns to block 62.

At block 66, a two-dimensional projection of the three-dimensional virtual visual space 20 is taken from the location 23 and in the direction 25 defined by the current point of view 24. The projection is then limited by the field of view 26 to produce the virtual visual scene 22. The method then returns to block 62.

FIG. 5B illustrates an example of a method 70 for updating a model of the virtual visual space 20 for augmented reality. Where the apparatus 30 enables augmented reality, the virtual visual space 20 comprises objects 11 from the real space 10 and also visual elements 28 not present in the real space 10. The combination of such visual elements 28 may be referred to as the artificial virtual visual space.

At block 72 it is determined whether or not the real space 10 has changed. If the real space 10 has changed the method moves to block 76. If the real space 10 has not changed the method moves to block 74. Detecting a change in the real space 10 may be achieved at a pixel level using differencing and may be achieved at an object level using computer vision to track objects as they move.

At block 74 it is determined whether or not the artificial virtual visual space has changed. If the artificial virtual visual space has changed the method moves to block 76. If the artificial virtual visual space has not changed the method returns to block 72. As the artificial virtual visual space is generated by the controller 42 changes to the visual elements 28 are easily detected.

At block 76, the model of the virtual visual space 20 is updated.

The blocks illustrated in the FIGS. 5A & 5B may represent steps in a method and/or sections of code in the computer program 48. The illustration of a particular order to the blocks does not necessarily imply that there is a required or preferred order for the blocks and the order and arrangement of the block may be varied. Furthermore, it may be possible for some blocks to be omitted.

Figure 6A:
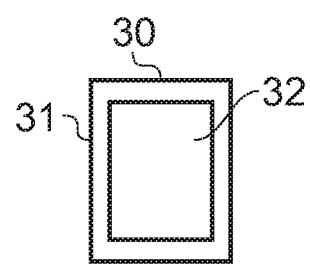
FIGS. 6A and 6B illustrate examples of apparatus that enable display of at least parts of the virtual visual scene to a user.
Figure 6B:
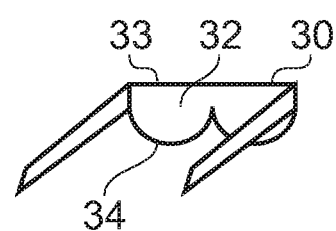

FIGS. 6A and 6B illustrate examples of apparatus 30 that enable display of at least parts of the virtual visual scene 22 to a user and rendering of audio to a user.

FIG. 6A illustrates a handheld apparatus 31 comprising a display screen as display 32 that displays images to a user and is used for displaying the virtual visual scene 22 to the user. The apparatus 30 may be moved deliberately in the hands of a user in one or more of the previously mentioned six degrees of freedom. The handheld apparatus 31 may house the sensors 45 for determining changes in the real point of view from a change in orientation of the apparatus 30. The handheld apparatus 31 may house the sensors 45 for determining changes in the real point of view from a change in a user controlled device such as, for example, a actuation of buttons, virtual buttons, slider, joystick, etc. The handheld apparatus 31 may be or may be operated as a see-video arrangement for augmented reality that enables a live or recorded video of a real visual scene 12 to be displayed on the display 32 for viewing by the user while one or more visual elements 28 are simultaneously displayed on the display 32 for viewing by the user. The combination of the displayed real visual scene 12 and displayed one or more visual elements 28 provides the virtual visual scene 22 to the user.

If the handheld apparatus 31 has a camera mounted on a face opposite the display 32, it may be operated as a see-video arrangement that enables a live real visual scene 12 to be viewed while one or more visual elements 28 are displayed to the user to provide in combination the virtual visual scene 22.

FIG. 6B illustrates a head-mounted apparatus 33 comprising a display 32 that displays images to a user. The head-mounted apparatus 33 may be moved automatically when a head of the user moves. The head-mounted apparatus 33 may house the sensors 45 for gaze direction detection and/or selection gesture detection.

The head-mounted apparatus 33 may be a see-through arrangement for augmented reality that enables a live real visual scene 12 to be viewed while one or more visual elements 28 are displayed by the display 32 to the user to provide in combination the virtual visual scene 22. In this case a visor 34, if present, is transparent or semi-transparent so that the live real visual scene 12 can be viewed through the visor 34.

The head-mounted apparatus 33 may be operated as a see-video arrangement for augmented reality that enables a live or recorded video of a real visual scene 12 to be displayed by the display 32 for viewing by the user while one or more visual elements 28 are simultaneously displayed by the display 32 for viewing by the user. The combination of the displayed real visual scene 12 and displayed one or more visual elements 28 provides the virtual visual scene 22 to the user. In this case a visor 34 is opaque and may be used as display 32.

Other examples of apparatus 30 that enable display of at least parts of the virtual visual scene 22 to a user may be used.

For example, one or more projectors may be used that project one or more visual elements to provide augmented reality by supplementing a real visual scene of a physical real world environment (real space).

For example, multiple projectors or displays may surround a user to provide virtual reality by presenting a fully artificial environment (a virtual visual space) as a virtual visual scene to the user.

Referring back to FIG. 4, an apparatus 30 may enable user-interactive mediation for mediated reality and/or augmented reality and/or virtual reality. The user input circuitry 44 detects user actions using user input 43. These user actions are used by the controller 42 to determine what happens within the virtual visual space 20. This may enable interaction with a visual element 28 within the virtual visual space 20.

The detected user actions may, for example, be gestures performed in the real space 10. Gestures may be detected in a number of ways. For example, depth sensors 49 may be used to detect movement of parts a user 18 and/or or image sensors 47 may be used to detect movement of parts of a user 18 and/or positional/movement sensors attached to a limb of a user 18 may be used to detect movement of the limb.

Object tracking may be used to determine when an object or user changes. For example, tracking the object on a large macro-scale allows one to create a frame of reference that moves with the object. That frame of reference can then be used to track time-evolving changes of shape of the object, by using temporal differencing with respect to the object. This can be used to detect small scale human motion such as gestures, hand movement, finger movement, facial movement. These are scene independent user (only) movements relative to the user.

The apparatus 30 may track a plurality of objects and/or points in relation to a user's body, for example one or more joints of the user's body. In some examples, the apparatus 30 may perform full body skeletal tracking of a user's body. In some examples, the apparatus 30 may perform digit tracking of a user's hand.

The tracking of one or more objects and/or points in relation to a user's body may be used by the apparatus 30 in action recognition.

Figure 7A:
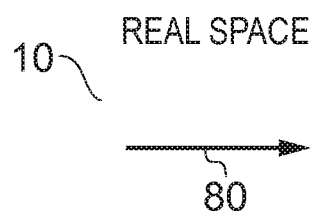
FIG. 7A, illustrates an example of a gesture in real space

Referring to FIG. 7A, a particular action 80 in the real space 10 is an action user input used as a 'user control' event by the controller 42 to determine what happens within the virtual visual space 20. An action user input is an action 80 that has meaning to the apparatus 30 as a user input.

Figure 7B:
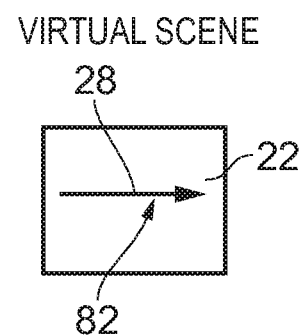
FIG. 7B, illustrates a corresponding representation rendered, in the virtual visual scene, of the gesture in real space.

Referring to FIG. 7B, illustrates that in some but not necessarily all examples, a corresponding representation of the action 80 in real space is rendered in the virtual visual scene 22 by the apparatus 30. The representation involves one or more visual elements 28 moving 82 to replicate or indicate the action 80 in the virtual visual scene 22.

An action 80 may be static or moving. A moving action may comprise a movement or a movement pattern comprising a series of movements. For example it could be making a circling motion or a side to side or up and down motion or the tracing of a sign in space. A moving action may, for example, be an apparatus-independent action or an apparatus-dependent action. A moving action may involve movement of a user input object e.g. a user body part or parts, or a further apparatus, relative to the sensors. The body part may comprise the user's hand or part of the user's hand such as one or more fingers and thumbs. In other examples, the user input object may comprise a different part of the body of the user such as their head or arm. Three-dimensional movement may comprise motion of the user input object in any of six degrees of freedom. The motion may comprise the user input object moving towards or away from the sensors as well as moving in a plane parallel to the sensors or any combination of such motion.

An action 80 may be a non-contact action. A non-contact action does not contact the sensors at any time during the action.

A action 80 may be an absolute action that is defined in terms of an absolute displacement from the sensors. Such an action may be tethered, in that it is performed at a precise location in the real space 10. Alternatively an action 80 may be a relative action that is defined in terms of relative displacement during the action. Such an action may be un-tethered, in that it need not be performed at a precise location in the real space 10 and may be performed at a large number of arbitrary locations.

A action 80 may be defined as evolution of displacement, of a tracked point relative to an origin, with time. It may, for example, be defined in terms of motion using time variable parameters such as displacement, velocity or using other kinematic parameters. An un-tethered action may be defined as evolution of relative displacement $\Delta d$ with relative time $\Delta t$.

A action 80 may be performed in one spatial dimension (1D action), two spatial dimensions (2D action) or three spatial dimensions (3D action).

The action 80 may be a gesture.

Figure 8:
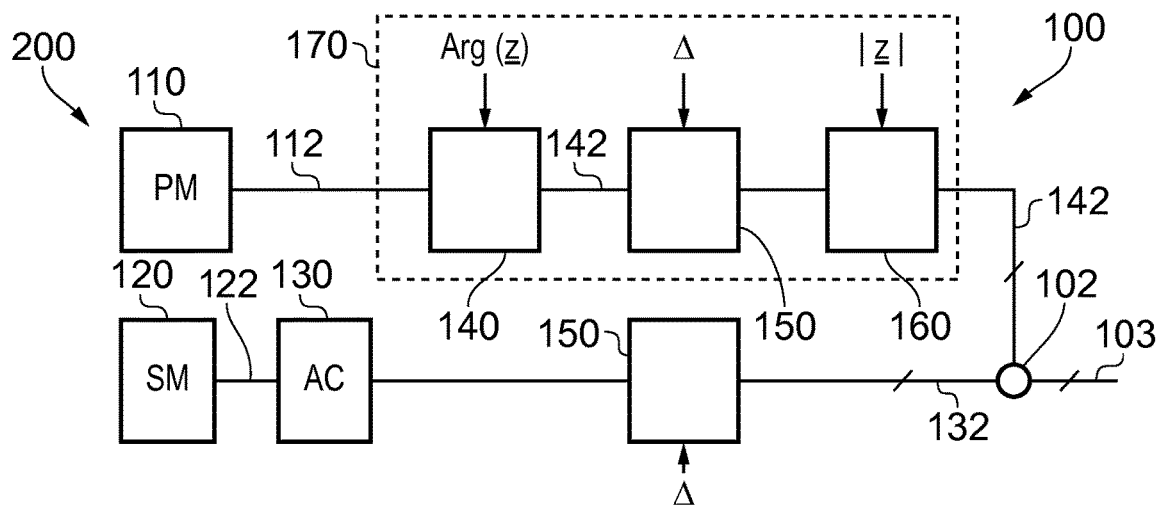
FIG. 8 illustrates an example of a system for modifying a rendered sound scene.

FIG. 8 illustrates an example of a system 100 and also an example of a method 200. The system 100 and method 200 record a sound space and process the recorded sound space to enable a rendering of the recorded sound space as a rendered sound scene for a listener at a particular position (the origin) and orientation within the sound space.

A sound space is an arrangement of sound sources in a three-dimensional space. A sound space may be defined in relation to recording sounds (a recorded sound space) and in relation to rendering sounds (a rendered sound space).

The system 100 may optionally comprise one or more portable microphones 110 and/or may optionally comprise one or more static microphones 120.

In this example, but not necessarily all examples, the origin of the sound space is at a microphone. In this example, the microphone at the origin is a static microphone 120. It may record one or more channels, for example it may be a microphone array. However, the origin may be at any arbitrary position.

In this example, only a single static microphone 120 is illustrated. However, in other examples multiple static microphones 120 may be used independently.

The system 100 optionally comprises one or more portable microphones 110. The portable microphone 110 may, for example, move with a sound source within the recorded sound space. The portable microphone may, for example, be an 'up-close' microphone that remains close to a sound source. This may be achieved, for example, using a boom microphone or, for example, by attaching the microphone to the sound source, for example, by using a Lavalier microphone. The portable microphone 110 may record one or more recording channels.

The relative position of the portable microphone PM 110 from the origin may be represented by the vector z. The vector z therefore positions the portable microphone 110 relative to a notional listener of the recorded sound space.

The relative orientation of the notional listener at the origin may be represented by the value $\Delta$. The orientation value $\Delta$ defines the notional listener's 'point of view' which defines the sound scene. The sound scene is a representation of the sound space listened to from a particular point of view within the sound space.

When the sound space as recorded is rendered to a user (listener) via the system 100 in FIG. 1, it is rendered to the listener as if the listener is positioned at the origin of the recorded sound space with a particular orientation. It is therefore important that, as the portable microphone 110 moves in the recorded sound space, its position z relative to the origin of the recorded sound space is tracked and is correctly represented in the rendered sound space. The system 100 is configured to achieve this.

The audio signals 122 output from the static microphone 120 are coded by audio coder 130 into a multichannel audio signal 132. If multiple static microphones were present, the output of each would be separately coded by an audio coder into a multichannel audio signal.

The audio coder 130 may be a spatial audio coder such that the multichannel audio signals 132 represent the sound space as recorded by the static microphone 120 and can be rendered giving a spatial audio effect. For example, the audio coder 130 may be configured to produce multichannel audio signals 132 according to a defined standard such as, for example, binaural coding, 5.1 surround sound coding, 7.1 surround sound coding etc. If multiple static microphones were present, the multichannel signal of each static microphone would be produced according to the same defined standard such as, for example, binaural coding, 5.1 surround sound coding, and 7.1 surround sound coding and in relation to the same common rendered sound space.

The multichannel audio signals 132 from one or more the static microphones 120 are mixed by mixer 102 with multichannel audio signals 142 from the one or more portable microphones 110 to produce a multi-microphone multichannel audio signal 103 that represents the recorded sound scene relative to the origin and which can be rendered by an audio decoder corresponding to the audio coder 130 to reproduce a rendered sound scene to a listener that corresponds to the recorded sound scene when the listener is at the origin.

The multichannel audio signal 142 from the, or each, portable microphone 110 is processed before mixing to take account of any movement of the portable microphone 110 relative to the origin at the static microphone 120.

The audio signals 112 output from the portable microphone 110 are processed by the positioning block 140 to adjust for movement of the portable microphone 110 relative to the origin. The positioning block 140 takes as an input the vector z or some parameter or parameters dependent upon the vector z. The vector z represents the relative position of the portable microphone 110 relative to the origin.

The positioning block 140 may be configured to adjust for any time misalignment between the audio signals 112 recorded by the portable microphone 110 and the audio signals 122 recorded by the static microphone 120 so that they share a common time reference frame. This may be achieved, for example, by correlating naturally occurring or artificially introduced (non-audible) audio signals that are present within the audio signals 112 from the portable microphone 110 with those within the audio signals 122 from the static microphone 120. Any timing offset identified by the correlation may be used to delay/advance the audio signals 112 from the portable microphone 110 before processing by the positioning block 140.

The positioning block 140 processes the audio signals 112 from the portable microphone 110, taking into account the relative orientation (Arg(z)) of that portable microphone 110 relative to the origin at the static microphone 120.

The audio coding of the static microphone audio signals 122 to produce the multichannel audio signal 132 assumes a particular orientation of the rendered sound space relative to an orientation of the recorded sound space and the audio signals 122 are encoded to the multichannel audio signals 132 accordingly.

The relative orientation Arg (z) of the portable microphone 110 in the recorded sound space is determined and the audio signals 112 representing the sound object are coded to the multichannels defined by the audio coding 130 such that the sound object is correctly oriented within the rendered sound space at a relative orientation Arg (z) from the listener. For example, the audio signals 112 may first be mixed or encoded into the multichannel signals 142 and then a transformation T may be used to rotate the multichannel audio signals 142, representing the moving sound object, within the space defined by those multiple channels by Arg (z).

An orientation block 150 may be used to rotate the multichannel audio signals 142 by Δ, if necessary. Similarly, an orientation block 150 may be used to rotate the multichannel audio signals 132 by Δ, if necessary.

The functionality of the orientation block 150 is very similar to the functionality of the orientation function of the positioning block 140 except it rotates by Δ instead of Arg(z).

In some situations, for example when the sound scene is rendered to a listener through a head-mounted audio output device 30, for example headphones using binaural audio coding, it may be desirable for the rendered sound space 90 to remain fixed in real space 10 when the listener turns their head in space. This means that the rendered sound space 90 needs to be rotated relative to the audio output device 30 by the same amount in the opposite sense to the head rotation. The orientation of the rendered sound space 90 tracks with the rotation of the listener's head so that the orientation of the rendered sound space 90 remains fixed in space and does not move with the listener's head.

The portable microphone signals 112 are additionally processed to control the perception of the distance D of the sound object from the listener in the rendered sound scene, for example, to match the distance |z| of the sound object from the origin in the recorded sound space. This can be useful when binaural coding is used so that the sound object is, for example, externalized from the user and appears to be at a distance rather than within the user's head, between the user's ears. The distance block 160 processes the multichannel audio signal 142 to modify the perception of distance.

Figure 9:
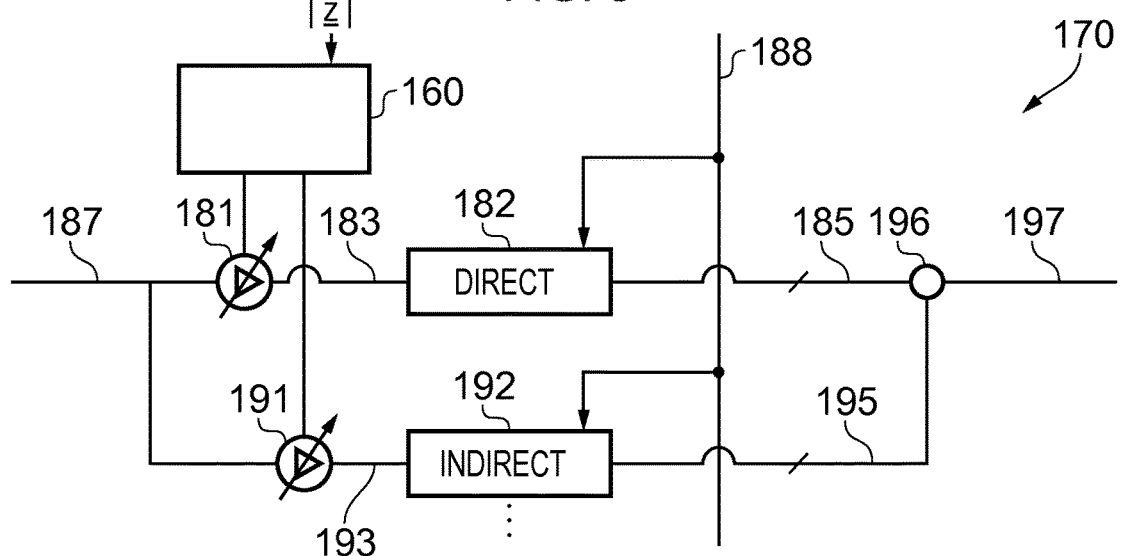
FIG. 9 illustrates an example of a module which may be used, for example, to perform the functions of the positioning block, orientation block and distance block of the system.

FIG. 9 illustrates a module 170 which may be used, for example, to perform the method 200 and/or functions of the positioning block 140, orientation block 150 and distance block 160 in FIG. 8. The module 170 may be implemented using circuitry and/or programmed processors.

The Figure illustrates the processing of a single channel of the multichannel audio signal 142 before it is mixed with the multichannel audio signal 132 to form the multi-microphone multichannel audio signal 103. A single input channel of the multichannel signal 142 is input as signal 187.

The input signal 187 passes in parallel through a "direct" path and one or more "indirect" paths before the outputs from the paths are mixed together, as multichannel signals, by mixer 196 to produce the output multichannel signal 197. The output multichannel signal 197, for each of the input channels, are mixed to form the multichannel audio signal 142 that is mixed with the multichannel audio signal 132.

The direct path represents audio signals that appear, to a listener, to have been received directly from an audio source and an indirect path represents audio signals that appear to a listener to have been received from an audio source via an indirect path such as a multipath or a reflected path or a refracted path.

The distance block 160 by modifying the relative gain between the direct path and the indirect paths, changes the perception of the distance D of the sound object from the listener in the rendered sound space 90.

Each of the parallel paths comprises a variable gain device 181, 191 which is controlled by the distance block 160.

The perception of distance can be controlled by controlling relative gain between the direct path and the indirect (decorrelated) paths. Increasing the indirect path gain relative to the direct path gain increases the perception of distance.

In the direct path, the input signal 187 is amplified by variable gain device 181, under the control of the distance block 160, to produce a gain-adjusted signal 183. The gain-adjusted signal 183 is processed by a direct processing module 182 to produce a direct multichannel audio signal 185.

In the indirect path, the input signal 187 is amplified by variable gain device 191, under the control of the distance block 160, to produce a gain-adjusted signal 193. The gain-adjusted signal 193 is processed by an indirect processing module 192 to produce an indirect multichannel audio signal 195.

The direct multichannel audio signal 185 and the one or more indirect multichannel audio signals 195 are mixed in the mixer 196 to produce the output multichannel audio signal 197.

The direct processing block 182 and the indirect processing block 192 both receive direction of arrival signals 188. The direction of arrival signal 188 gives the orientation Arg(z) of the portable microphone 110 (moving sound object) in the recorded sound space and the orientation Δ of the rendered sound space 90 relative to the notional listener/audio output device 300.

The position of the moving sound object changes as the portable microphone 110 moves in the recorded sound space and the orientation of the rendered sound space changes as a head-mounted audio output device rendering the sound space rotates.

The direct processing block 182 may, for example, include a system 184 that rotates the single channel audio signal, gain-adjusted input signal 183, in the appropriate multichannel space producing the direct multichannel audio signal 185. The system uses a transfer function to performs a transformation T that rotates multichannel signals within the space defined for those multiple channels by Arg(z) and by Δ, defined by the direction of arrival signal 188. For example, a head related transfer function (HRTF) interpolator may be used for binaural audio. As another example, Vector Base Amplitude Panning (VBAP) may be used for loudspeaker format (e.g. 5.1) audio.

The indirect processing block 192 may, for example, use the direction of arrival signal 188 to control the gain of the single channel audio signal, the gain-adjusted input signal 193, using a variable gain device 194. The amplified signal is then processed using a static decorrelator 196 and a static transformation T to produce the indirect multichannel audio signal 195. The static decorrelator in this example uses a pre-delay of at least 2 ms. The transformation T rotates multichannel signals within the space defined for those multiple channels in a manner similar to the direct system but by a fixed amount. For example, a static head related transfer function (HRTF) interpolator may be used for binaural audio.

It will therefore be appreciated that the module 170 can be used to process the portable microphone signals 112 and perform the functions of:

(i) changing the relative position (orientation Arg(z) and/or distance |z|) of a rendered sound object, from a listener in the rendered sound space and (ii) changing the orientation of the rendered sound space (including the rendered sound object positioned according to (i)).

It should also be appreciated that the module 170 may also be used for performing the function of the orientation block 150 only, when processing the audio signals 122 provided by the static microphone 120. However, the direction of arrival signal will include only Δ and will not include Arg(z). In some but not necessarily all examples, gain of the variable gain devices 191 modifying the gain to the indirect paths may be put to zero and the gain of the variable gain device 181 for the direct path may be fixed. In this instance, the module 170 reduces to a system that rotates the recorded sound space to produce the rendered sound space according to a direction of arrival signal that includes only Δ and does not include Arg(z).

Figure 10:
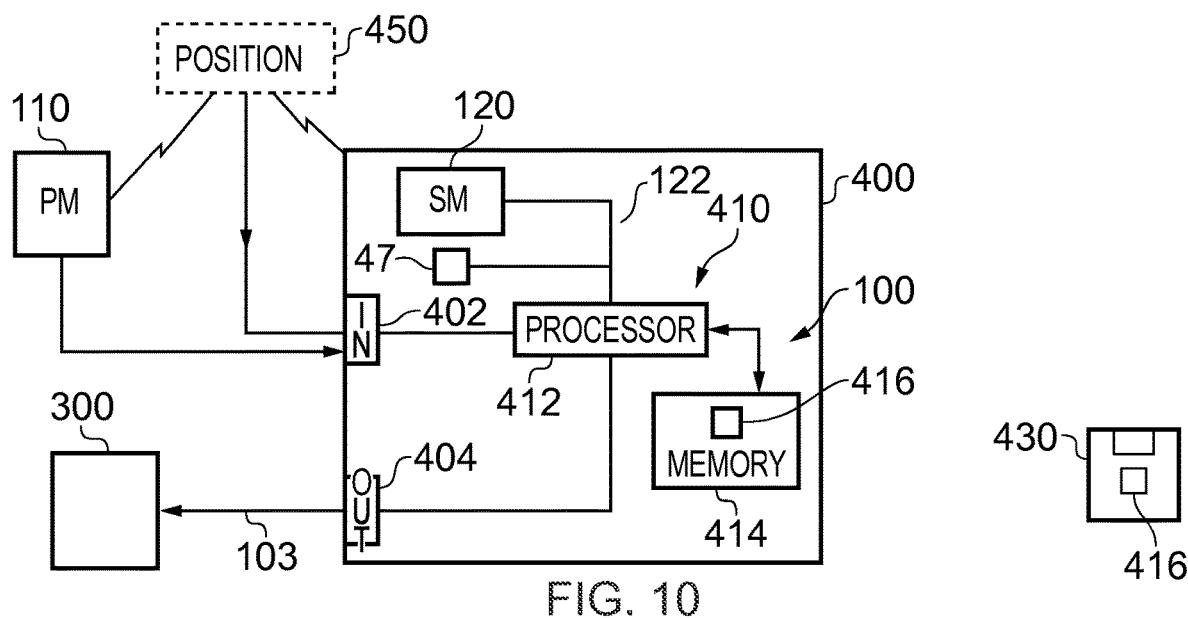
FIG. 10 illustrates an example of the system/module implemented using an apparatus.

FIG. 10 illustrates an example of the system 100 implemented using an apparatus 400. The apparatus 400 may, for example, be a static electronic device, a portable electronic device or a hand-portable electronic device that has a size that makes it suitable to be carried on a palm of a user or in an inside jacket pocket of the user.

In this example, the apparatus 400 comprises the static microphone 120 as an integrated microphone but does not comprise the one or more portable microphones 110 which are remote. In this example, but not necessarily all examples, the static microphone 120 is a microphone array. However, in other examples, the apparatus 400 does not comprise the static microphone 120.

The apparatus 400 comprises an external communication interface 402 for communicating externally with external microphones, for example, the remote portable microphone(s) 110. This may, for example, comprise a radio transceiver.

A positioning system 450 is illustrated as part of the system 100. This positioning system 450 is used to position the portable microphone(s) 110 relative to the origin of the sound space e.g. the static microphone 120. In this example, the positioning system 450 is illustrated as external to both the portable microphone 110 and the apparatus 400. It provides information dependent on the position z of the portable microphone 110 relative to the origin of the sound space to the apparatus 400. In this example, the information is provided via the external communication interface 402, however, in other examples a different interface may be used. Also, in other examples, the positioning system may be wholly or partially located within the portable microphone 110 and/or within the apparatus 400.

The position system 450 provides an update of the position of the portable microphone 110 with a particular frequency and the term 'accurate' and 'inaccurate' positioning of the sound object should be understood to mean accurate or inaccurate within the constraints imposed by the frequency of the positional update. That is accurate and inaccurate are relative terms rather than absolute terms.

The position system 450 enables a position of the portable microphone 110 to be determined. The position system 450 may receive positioning signals and determine a position which is provided to the processor 412 or it may provide positioning signals or data dependent upon positioning signals so that the processor 412 may determine the position of the portable microphone 110.

There are many different technologies that may be used by a position system 450 to position an object including passive systems where the positioned object is passive and does not produce a positioning signal and active systems where the positioned object produces one or more positioning signals. An example of a system, used in the Kinect™ device, is when an object is painted with a non-homogenous pattern of symbols using infrared light and the reflected light is measured using multiple cameras and then processed, using the parallax effect, to determine a position of the object. An example of an active radio positioning system is when an object has a transmitter that transmits a radio positioning signal to multiple receivers to enable the object to be positioned by, for example, trilateration or triangulation. The transmitter may be a Bluetooth tag or a radio-frequency identification (RFID) tag, as an example. An example of a passive radio positioning system is when an object has a receiver or receivers that receive a radio positioning signal from multiple transmitters to enable the object to be positioned by, for example, trilateration or triangulation. Trilateration requires an estimation of a distance of the object from multiple, non-aligned, transmitter/receiver locations at known positions. A distance may, for example, be estimated using time of flight or signal attenuation. Triangulation requires an estimation of a bearing of the object from multiple, non-aligned, transmitter/receiver locations at known positions. A bearing may, for example, be estimated using a transmitter that transmits with a variable narrow aperture, a receiver that receives with a variable narrow aperture, or by detecting phase differences at a diversity receiver.

Other positioning systems may use dead reckoning and inertial movement or magnetic positioning.

The object that is positioned may be the portable microphone 110 or it may an object worn or carried by a person associated with the portable microphone 110 or it may be the person associated with the portable microphone 110.

The apparatus 400 wholly or partially operates the system 100 and method 200 described above to produce a multi-microphone multichannel audio signal 103.

The apparatus 400 provides the multi-microphone multi-channel audio signal 103 via an output communications interface 404 to an audio output device 300 for rendering.

In some but not necessarily all examples, the audio output device 300 may use binaural coding. Alternatively or additionally, in some but not necessarily all examples, the audio output device 300 may be a head-mounted audio output device.

In this example, the apparatus 400 comprises a controller 410 configured to process the signals provided by the static microphone 120 and the portable microphone 110 and the positioning system 450. In some examples, the controller 410 may be required to perform analogue to digital conversion of signals received from microphones 110, 120 and/or perform digital to analogue conversion of signals to the audio output device 300 depending upon the functionality at the microphones 110, 120 and audio output device 300. However, for clarity of presentation no converters are illustrated in FIG. 9.

Implementation of a controller 410 may be as controller circuitry. The controller 410 may be implemented in hardware alone, have certain aspects in software including firmware alone or can be a combination of hardware and software (including firmware).

As illustrated in FIG. 10 the controller 410 may be implemented using instructions that enable hardware functionality, for example, by using executable instructions of a computer program 416 in a general-purpose or special-purpose processor 412 that may be stored on a computer readable storage medium (disk, memory etc) to be executed by such a processor 412.

The processor 412 is configured to read from and write to the memory 414. The processor 412 may also comprise an output interface via which data and/or commands are output by the processor 412 and an input interface via which data and/or commands are input to the processor 412.

The memory 414 stores a computer program 416 comprising computer program instructions (computer program code) that controls the operation of the apparatus 400 when loaded into the processor 412. The computer program instructions, of the computer program 416, provide the logic and routines that enables the apparatus to perform the methods illustrated in FIGS. 1-19. The processor 412 by reading the memory 414 is able to load and execute the computer program 416.

The blocks illustrated in the FIGS. 8 and 9 may represent steps in a method and/or sections of code in the computer program 416. The illustration of a particular order to the blocks does not necessarily imply that there is a required or preferred order for the blocks and the order and arrangement of the block may be varied. Furthermore, it may be possible for some blocks to be omitted.

The preceding description describes, in relation to FIGS. 1 to 7, a system, apparatus 30, method 60 and computer program 48 that enables control of a virtual visual space 20 and the virtual visual scene 26 dependent upon the virtual visual space 20.

The preceding description describes. In relation to FIGS. 8 to 10, a system 100, apparatus 400, method 200 and computer program 416 that enables control of a sound space 90 and the sound scene 92 dependent upon the sound space 90.

The functionality that enables control of a virtual visual space 20 and the virtual visual scene 26 dependent upon the virtual visual space 20 and the functionality that enables control of a sound space and the sound scene 92 dependent upon the sound space 90 may be provided by the same apparatus 30, 400, system 100, method 60, 200 or computer program 48, 416.

Figure 11A:
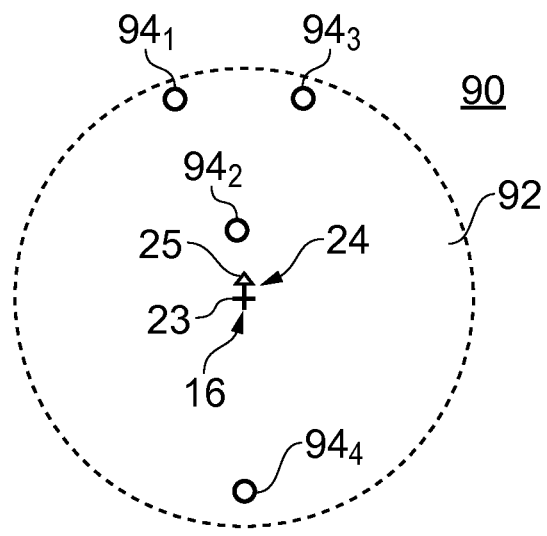
FIG. 11A illustrates a sound scene comprising sound objects.

FIG. 11A illustrates, from a top perspective, an example of a sound space 90 that corresponds to the virtual visual space 20. FIG. 11A is a two-dimensional projection or cross-section of the three dimensional sound space 90. The sound space 90 defines a sound scene 92. The apparatus 30 comprises a rendering device or devices 32, which may render information to a user aurally via audio output, for example via loudspeakers.

In some but not necessarily all examples, the virtual visual space 20 and the sound space 90 may be corresponding and form a combined virtual space 90,20. "Correspondence" or "corresponding" when used in relation to a sound space 90 and a virtual visual space means that the sound space 90 and virtual visual space 20 are time and space aligned as combined virtual space 90,20, that is they are the same space at the same time.

The correspondence between virtual visual space 20 and sound space 90 results in correspondence between the virtual visual scene 22 and the sound scene 92 to form a combined virtual scene 92,22. "Correspondence" or "corresponding" when used in relation to a sound scene 92 and a virtual visual scene 22 means that the sound space 90 and virtual visual space 20 are corresponding and a notional listener whose point of view defines the sound scene 92 and a notional viewer whose point of view defines the virtual visual scene 22 are at the same position and orientation, that is they have the same point of view 24.

In FIG. 11A, the sound space 90 and the virtual visual space 20 form a combined virtual space 90,20. The sound space 90 is an arrangement of sound sources 94 in a three-dimensional space. In this example, the sound space 90 is a rendered sound space.

The sound space 90 defines a sound scene 92 that corresponds to the virtual visual scene 22. The sound scene 92 and the virtual visual scene 22 form a combined virtual scene 92, 22. The sound scene 92 is a representation of the sound space 90 listened to from a particular point of view of a virtual listener (user) 16 within the sound space 90. The sound scene 92 is first person perspective-mediated. The user's real point of view determines the point of view within the sound space, changing the sound scene 92.

In this example, the point of view within the sound space 90 corresponds to the point of view 24 within the virtual visual space 20 and the same label is used. The virtual scene 92,22 is first person perspective-mediated. The user's real point of view determines the point of view 24 of the virtual user 16 within the combined virtual space 90, 20, changing the combined virtual scene 92, 22.

Correspondence in this sense means that there is a one-to-one mapping between the sound space 90 and the virtual visual space 20 such that a position in the sound space 90 has a corresponding position in the virtual visual space 20 and a position in the virtual visual space 20 has a corresponding position in the sound space 90. Correspondence in this sense means that there is a one-to-one mapping between the sound scene 92 and the virtual visual scene 22 such that a position in the sound scene 92 has a corresponding position in the virtual visual scene 22 and a position in the virtual visual scene 22) has a corresponding position in the sound scene 92) Corresponding also means that the coordinate system of the sound space 90/sound scene 92 and the coordinate system of the virtual visual space 20/virtual visual scene 22 are in register such that an object is positioned as a sound object in the sound scene and as a visual object in the visual scene at the same common position from the perspective of a virtual user 16.

In this illustrated example, the user actions determine the point of view 24 within the sound space 90 (and virtual visual space 20), changing the sound scene 92 and the virtual visual scene 22 simultaneously. For example, a position 23 of the point of view 24 within the virtual space 92, 20 may be changed and/or a direction or orientation 25 of the point of view 24 within the virtual space 92, 20 may be changed. If the virtual space 92, 20 is three-dimensional, the position 23 of the point of view 24 has three degrees of freedom e.g. up/down, forward/back, left/right and the direction 25 of the point of view 24 within the virtual visual space 20 has three degrees of freedom e.g. roll, pitch, yaw. The point of view 24 may be continuously variable in position 23 and/or direction 25 and user action then changes the position and/or direction of the point of view 24 continuously. Alternatively, the point of view 24 may have discrete quantised positions 23 and/or discrete quantised directions 25 and user action switches by discretely jumping between the allowed positions 23 and/or directions 25 of the point of view 24.

As previously described, user input circuitry 44 detects the user's real point of view 14 using user point of view sensor 45. The user's real point of view is used by the controller 42 to determine the point of view 24 of the virtual user 16 within the virtual space 92, 20, changing the virtual scene 92, 22. Referring back to FIG. 3A, the real point of view 14 of the user 18 may be changed by the user 18. For example, a real location 13 of the real point of view 14 is the location of the user 18 and can be changed by changing the physical location 13 of the user 18. For example, a real direction 15 of the real point of view 14 is the direction in which the user 18 is looking and can be changed by changing the real direction of the user 18. The real direction 15 may, for example, be changed by a user 18 changing an orientation of their head or view point and/or a user changing a direction of their gaze. A head-mounted apparatus 30 may be used to enable first-person perspective mediation by measuring a change in orientation of the user's head and/or a change in the user's direction of gaze. In some but not necessarily all examples, the apparatus 30 comprises as part of the input circuitry 44 point of view sensors 45 for determining changes in the real point of view.

The user exists as a real user 18 in real space 10 and also as a virtual user 16 in the virtual space 90, 20. The term 'user' will depending on context mean the real user 18 in the real space 10 and/or the user 16 in the virtual space 90, 20. For example, actions are performed by the user 18 in real space 10 but they have meaning in the virtual space 90, 20 as actions performed by the virtual user 16. For example, a point of view 14 in real space 10 is controlled by the real user 18 in real space 10 but produces a corresponding point of view 24 for the virtual user 16 in the virtual space 90, 20.

Figure 11B:
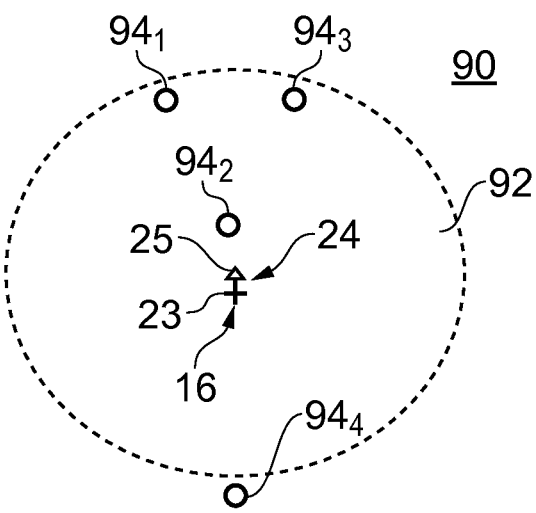
FIG. 11B illustrates a sound scene comprising sound objects.

FIGS. 11A and 11B illustrate examples in which the user's point of view 24 is the same relative to the same sound space 90, and different sound scenes 92 are rendered to the user 18 based on different modelled hearing acuity in different directions. In FIG. 11A, the range within which a sound object 94 is rendered (which defines the sound scene 92) is the same in all directions. In FIG. 11B, the range within which a sound object 94 is rendered (which defines the sound scene 90) is greater within a spread of angles centered on the point of view 24 and is less at other angles, for example opposite the point of view 24. A sound object 94 refers to a sound source that is located within the sound space 90 and is rendered from a particular position within the sound space 90.

FIG. 11A illustrates a sound scene 92 comprising sound objects $94_1$, $94_2$, $94_3$ to the front and $94_4$ to the rear.

FIG. 11B illustrates a sound scene 92 comprising sound objects $94_1$, $94_2$, $94_3$ to the front but not comprising sound object $94_4$ to the rear.

Figure 11C:
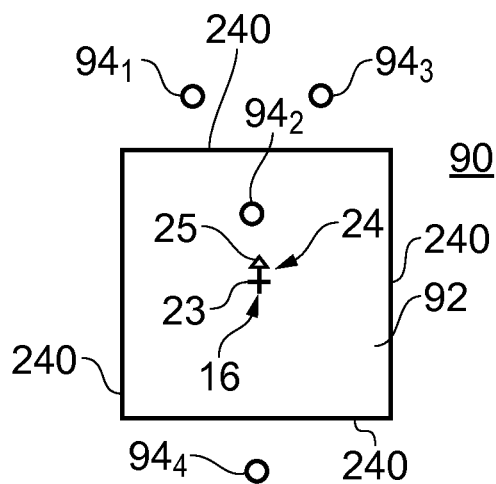
FIG. 11C illustrates an example of a modified sound scene based on the presence of virtual partitions.

FIG. 11C illustrates an example in which the user's point of view 24 is the same relative to the same sound space 90 as in FIGS. 11A & 11B, but a different sound scene 90 is rendered based on the presence of virtual partitions 240.

Although a particular arrangement (number, shape, position, orientation) of virtual partitions 240 is illustrated, it should be understood that different arrangements are possible. For example, a single virtual partition may surround the user 16, and the one or more virtual partitions may be differently shaped, positioned and orientation. For example different virtual partitions 240 may be independently shaped, positioned and orientated. The arrangement of virtual partitions 240 may be variable over time and there may at times be no virtual partitions 240. The variation of the virtual partitions 240 may be dynamic and responsive to user action. For example, in some but not necessarily all examples, there may initially be a sound scene 90 without any virtual partitions and in response to an action by the user (or some other event) the initial sound scene 90 is divided into smaller sound scenes 90 separated by virtual partitions 240.

In some but not necessarily all examples, the virtual partitions 240 define a modified sound scene 92 bounded by the virtual partition(s) 240 as illustrated in FIG. 11O. This modified sound scene 92 comprises the sound object $94_2$ but does not comprise the sound objects $94_1$, $94_3$, $94_4$.

The virtual partitions 240 divide the virtual space 90, 20. The virtual partitions 240 affect perception of the virtual space 90, 20 by a virtual user 16 having a position within the virtual space 90, 20.

In some but not all examples, the virtual partitions 240 affect rendering but do not affect the freedom the user has to change the point of view 24 (e.g. change position 23 and/or change direction 25).

In some but not necessarily all examples, the virtual partitions 240 affect audio rendering more than visual rendering.

Figure 11D:
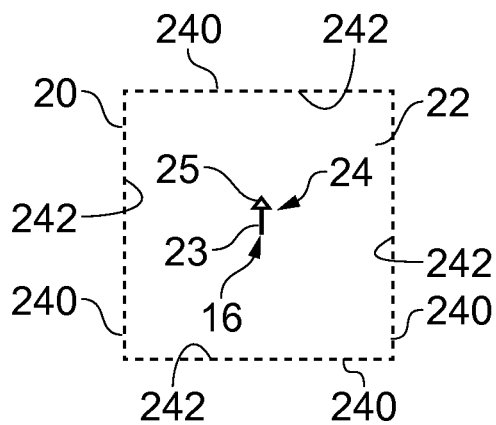
FIG. 11D illustrates a virtual visual space corresponding to the sound space illustrated in FIG. 11C.

FIG. 11D illustrates a virtual visual space 20 corresponding to the sound space 90 illustrated in FIG. 11C. The virtual partitions 240 may, for example, be transparent or semi-transparent partitions in the visual space 20. In some but not necessarily all examples visual indications 242 may be associated with the virtual partitions 240 in the virtual visual space 20 in association with the virtual partitions 240. The visual indications 242 visually identify virtual partitions 240 to the virtual user 16 in the virtual space 20,90 so that a user 16,18 can locate the virtual partitions 240 visually within the virtual visual space 20,90. One example of a visual indication 242 is a surface pattern over a surface of a virtual partition 240.

In the corresponding sound space 90, as illustrated in FIG. 11O, the virtual partitions 240 may be opaque or significantly opaque partitions of the sound space 90. The virtual partition 240 therefore blocks all or most sound that arises from a sound object 94 (e.g. sound object $94_4$ in FIG. 11C) that is behind a virtual partition 240. That is, the presence of a virtual partition 240 between a sound object $94_n$ and the virtual user 16 blocks all or most sound that arises from the sound object $94_n$ when the sound space 90 is rendered to a user 18.

Blocking sound that arises from a sound object $94_n$ may be achieved by removing the sound object $94_n$ from the sound scene 92 that is currently occupied by the virtual user 16.

Blocking most of the sound that arises from a sound object $94_n$ may be achieved by adapting the sound object $94_n$. This adaptation may comprise attenuating the sound object $94_n$ by reducing the volume of the sound object and/or applying a low-pass spectral filter to the sound object $94_n$ that attenuates higher frequency components more than lower frequency components. The adaptation may, for example, simulate the presence of a sound absorbing wall where a virtual partition 240 is located.

Figure 12:
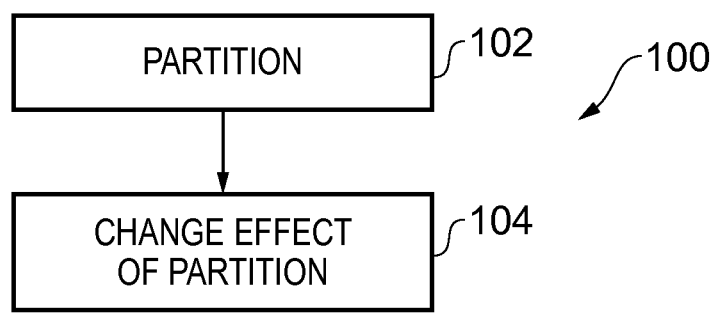
FIG. 12 illustrates a method for controlling how a virtual partition affects the virtual space perceived by the user in response to a trigger action.

FIG. 12 illustrates a method 100 for controlling how a virtual partition 240 affects the virtual space 90, 20 perceived by the user.

The method, at block 102, comprises dividing the virtual space 90, 20 using virtual partitions 240 that affect perception of the virtual space 90, 20 by a user 18 having a point of view 24 within the virtual space 90, 20.

The method 100, at block 104, comprises making a first change to how a first virtual partition 240 affects the virtual space 90, 20 perceived by the user 16,18. This is in response to a first action in the virtual space 90, 20 relative to the first virtual partition 240 by the user 16,18.

Figure 13A:
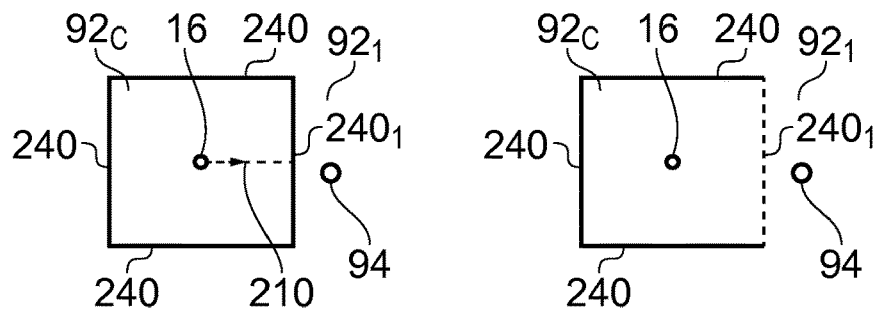
FIG. 13A illustrates an example of a gesture 210 as a trigger action.
Figure 13B:
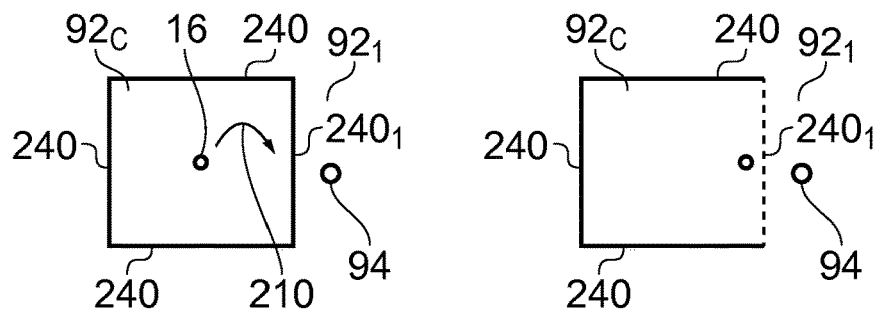
FIG. 13B illustrates a movement and gesture 210, in combination, as a trigger action.

As illustrated in FIGS. 13A and 13B, the first action 210 may, for example, be a movement and/or a gesture. The action 210 may change a relationship of the user 16 to the virtual partition $240_1$.

An example of a gesture 210 as a trigger is illustrated in FIG. 13A. In this example, the user 16,18 performs a gesture 210 relative to the virtual partition $240_1$. For example, the user 16,18 may point towards the virtual partition $240_1$ with one hand and simultaneously touches an ear with another hand. In response, the virtual partition $240_1$ is modified as illustrated by the change from solid line to dashed line in the Fig such that how the virtual partition $240_1$ affects the virtual space 90, 20 perceived by the user 16,18 changes.

An example of a movement 210 as a trigger is when the user 16, 18 moves towards the virtual partition 240.

An example of a movement and gesture 210, in combination, as a trigger is illustrated in FIG. 13B. In this example, the user 16,18 moves relative to the virtual partition $240_1$ and performs a gesture relative to the virtual partition $240_1$. For example, the user 16, 18 may move towards the virtual partition $240_1$ and place an ear at, on or near the virtual partition 240 or place their head adjacent the virtual partition $240_1$. In response, the virtual partition $240_1$ is modified as illustrated by the change from solid line to dashed line in the Fig such that how the virtual partition $240_1$ affects the virtual space 90, 20 perceived by the user 16,18 changes.

Tactile feedback may be provided to the user 18, when the user 16, 18 performs a trigger action 210 that will cause a change to how a virtual partition 240 affects the virtual space 90, 20 perceived by the user 16,18.

In the examples described, one or more partitions 240 around the user 16 define a current sound scene $92_c$ demarcated at least partly by the one or more virtual partitions 240. The sound scene $92_c$ is at least partially separated from a sound object 94 in another, different, sound scene $92_1$ by at least one virtual partition $240_1$.

Audio associated with a current sound scene $92_c$ is initially rendered to the user 16, 18 at a greater volume than audio associated with the separated sound object 94. This may be achieved by providing additional attenuation of the sound objects 94 outside the current sound scene $92_c$ during rendering of audio to the user 16,18.

In response to the first action 210 in the virtual space 90, 20 relative to a first virtual partition $240_1$ by the user 16,18, attenuation of the sound object 94 of the first sound scene $92_1$ separated from the current sound scene $92_c$ by that first virtual partition $240_1$ is changed. The attenuation of audio associated with that sound object 94 may be reduced. This results in the rendering of audio associated with the sound object 94 of the first sound scene $92_1$ to the user 16, 18 at an increased volume.

Figure 14:
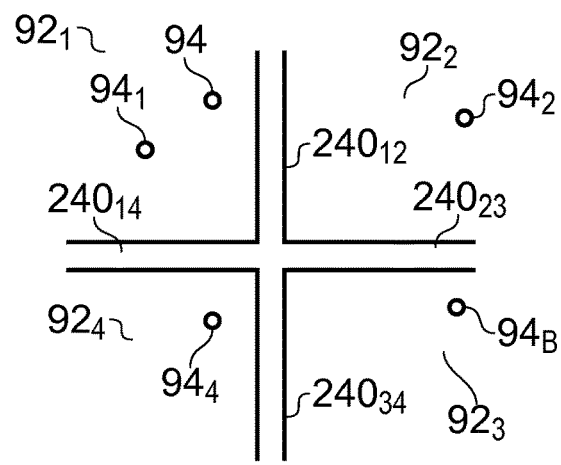
FIG. 14 illustrate how the virtual space may be divided into multiple different sound scenes.

FIG. 14 illustrate how the virtual space 90, 20 may be divided into multiple different sound scenes 92.

A plurality of partitions $240_{nm}$ define a plurality of sound scenes 92 demarcated at least partly by the virtual partitions 240. A sound scene $92_n$ is at least partially separated from an adjacent sound scene $92_m$ by at least one virtual partition $240_{nm}$. Each sound scene 92 comprises different sound objects $94_j$.

Initially, additional attenuation of audio associated with sound scenes 92 other than the current sound scene 92 is controlled during rendering of audio to the user 16, 18.

Audio associated with a current sound scene $92_c$ (c=1, 2, 3 or 4) is rendered to the user at a greater volume than audio associated with any other scene. The current scene is determined by a position of the virtual user 16 in the virtual space 90, 20. The current sound scene 92 is the sound scene 92 within which the virtual user 16 is currently located.

In response to the first trigger action 210 in the virtual space 90, 20 relative to a first virtual partition $240_1$ by the user 16,18, attenuation of the sound objects $94_i$ of the first sound scene $92_i$ (i≠c) separated from the current sound scene $92_c$ by that first virtual partition $240_{ci}$ (or $240_{ci}$) is changed. The attenuation of audio associated with those sound objects 94 may be reduced. This results in the rendering of audio associated with the sound objects 94 of the first sound scene $92_i$ to the user 16, 18 at an increased volume.

Figure 15:
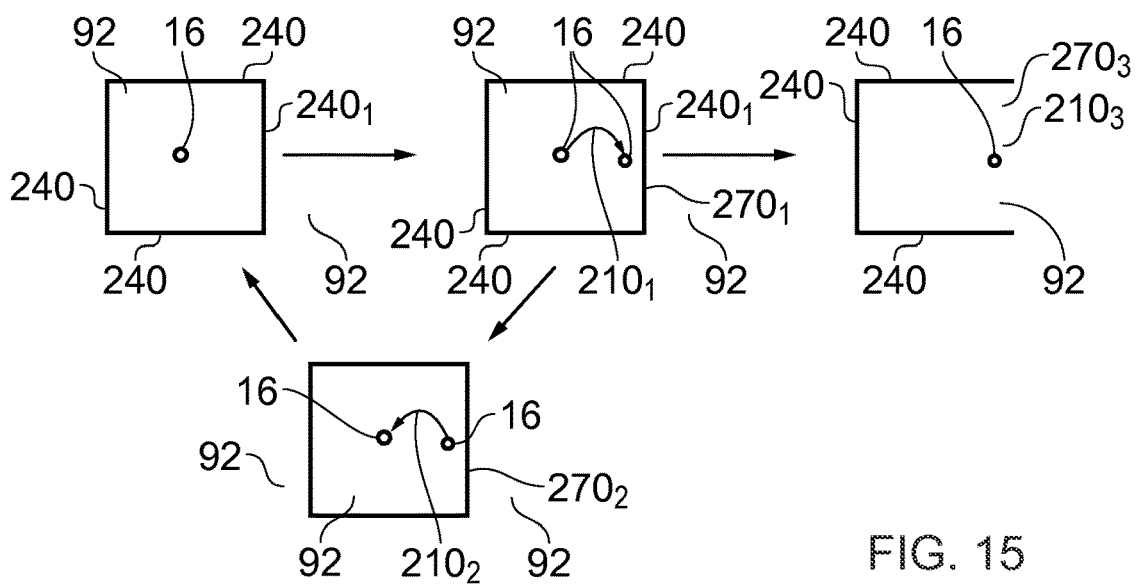
FIG. 15 illustrates examples of different changes in virtual partitions that affect the virtual space perceived by the user.

FIG. 15 illustrates examples of different changes in virtual partitions 240 and how the first virtual partition 240 affects the virtual space 90, 20 perceived by the user 16, 18.

In response to a first trigger action $210_1$ in the virtual space 90,20 relative to a first virtual partition $240_1$ by a virtual user 16, the method 100 makes a first change $270_1$ to how the first virtual partition $240_1$ affects the virtual space 90,20 perceived by the user 16,18.

In some but not necessarily all examples, the first trigger action $210_1$ relative to virtual partition $240_1$ temporarily changes how the virtual partition $240_1$ makes a first change $270_1$ to how virtual partition $240_1$ affects the virtual space 90,20 perceived by the user 16,18. The method may, for example, additionally comprise automatically undoing $210_2$ the first change $270_1$ by performing a further change $270_2$ to how the virtual partition $240_1$ affects the virtual space perceived by user, in the absence of continuation of the first action $210_1$. This corresponds to reverting to the state in existence before the first action $210_1$.

The method may additionally or alternatively comprise in response to a second action $210_3$ different to and independent of the first action $210_1$, removing the effect of the first virtual partition $240_1$ on the virtual space 90, 20 perceived by user. This corresponds to removing $270_3$ the first virtual partition $240_1$ and redefining the current sound scene 92.

Figure 16A:
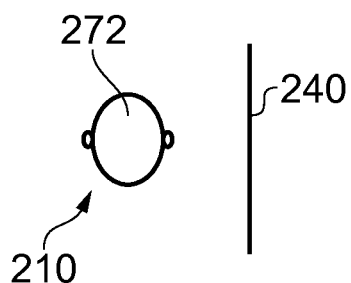
FIGS. 16A, 16B, 17A and 17B illustrates examples of suitable trigger actions relative to the virtual partition that trigger a change to how a virtual partition affects the virtual space perceived by the user.
Figure 16B:
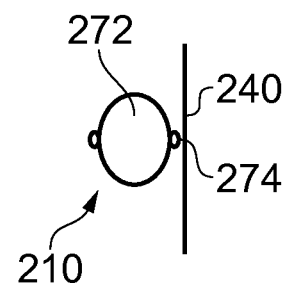

FIGS. 16A and 16B illustrate examples of suitable trigger actions 210 that trigger a change to how a virtual partition 240 affects the virtual space 90, 20 perceived by the user 16,18. The trigger action 210 is an action relative to the virtual partition 240 by the user 16,18.

In FIG. 16A, the trigger action 210 comprises the virtual user 16 in the virtual space 90, 20 bringing their head 272 in close proximity to the virtual partition 240 as if listening through the virtual partition 240. This triggers a change to how that virtual partition 240 affects the virtual space 90, 20 perceived by the user 16,18.

In FIG. 16B, the trigger action 210 comprises the virtual user 16 in the virtual space 90, 20 bringing their head 272 in close proximity to the virtual partition 240 and placing their ear 274 near or on or into the virtual partition 240 as if listening through the virtual partition 240. This triggers a change to how that virtual partition 240 affects the virtual space 90, 20 perceived by the user 16,18.

Figure 17A:
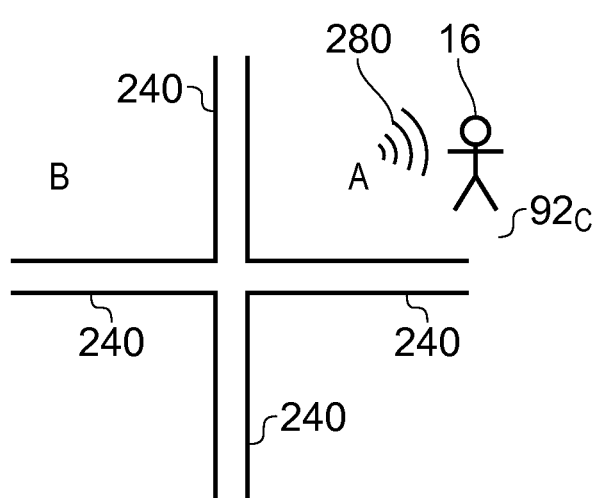

FIG. 17A schematically illustrates an example of the audio rendered to the user 16, 18 before the trigger action 210. The rendered audio 280 comes from the current sound scene $92_c$ at a normal volume. No rendered audio comes from the adjacent sound scene 92 beyond the virtual partition 240.

Figure 17B:
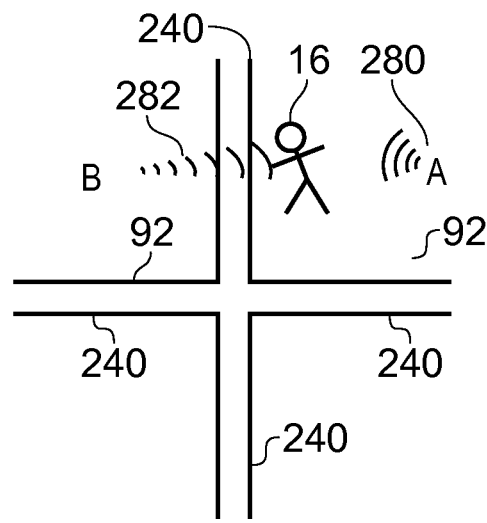

FIG. 17B schematically illustrates an example of the audio rendered to the user 16, 18 after the trigger action 210 relative to the virtual partition 240 by the user 16,18. The rendered audio 280 comes from the current scene $92_c$ at a reduced volume. Additional rendered audio 282 comes from the adjacent sound scene 92 beyond the virtual partition 240.

Confirmatory haptic feedback may be provided to the user 18 after a virtual user 16 performs the trigger action 210 in the virtual space 90, 20 to confirm that a user action has been performed that will cause a change to how a virtual partition 240 affects the virtual space 90, 20 perceived by the user 16,18.

The apparatus 30 comprises a rendering device or devices 32, which may render information to a user haptically via a haptic device.

FIGS. 18A to 18D illustrates examples of how virtual partitions 240 may be created and adapted.

In some but not necessarily all examples, the arrangement of virtual partitions 240 that affect perception of the virtual space 90,20 by a virtual user 16 within the virtual space may be initially defined automatically and/or by a user 18.

In some but not necessarily all examples the arrangement of virtual partitions 240 that affect perception of the virtual space 20,90 by a virtual user 16 within the virtual space may be dynamically changed (variable changes over time), changing the division of the virtual space 90,20 into sound scenes 92 by the virtual partitions 240.

For example, virtual partitions 240 may be kept and/or removed and/or added. This may occur automatically. Alternatively or additionally, it may occur in response to a control input from the user 18.

For example, one or more virtual partitions 240 may be modified by changing its shape, orientation or position or by changing the effect it has on perception of the virtual space 90,20 by the user 16,18. This may occur automatically. Alternatively or additionally, it may occur in response to a control input from the user 18.

FIG. 18A illustrates an arrangement of capturing devices 290 used to capture content defining the virtual space 90,20. The arrangement is presented at a scale and orientation that matches the virtual space illustrated in FIGS. 18B-18D such that a real position of the capturing device 290 corresponds to a virtual position of the capturing device in the virtual space 90,20.

In FIG. 18B, the arrangement of virtual partitions 240 is determined based the virtual positions of the capturing devices 290. The division of the virtual space 90,20 using virtual partitions 240 that affect perception of the virtual space 90,20 by a user 16 within the virtual space 90,20 is determined by locating the virtual partitions 240 in dependence upon the virtual positions of the capturing devices 290. In this example, as illustrated in FIG. 18B, each capturing device defines a segment 292 of the virtual space and each segment 292 is a sound scene 92. The sound scenes/segments are separated by virtual partitions 240. A capturing device 290 may comprise a video capturing device or devices 47 and/or an audio capturing device or devices 110, 120, as illustrated in the apparatus 400 of FIG. 10.

The position of the virtual partitions 240 is thus determined by the positions of the capturing devices 290 used to capture the virtual space 90,20. In this example, the positions of the virtual partitions 240 are at boundaries between capturing devices 290 used to capture the virtual space 90,20.

FIG. 18C illustrates an arrangement of virtual partitions 240 in a virtual space 90,20 that is based upon grouping of sound sources 94.

A sound source may be a sound object that is directly associated with a position in the virtual space.

Alternatively, a sound source may be sound that is indirectly associated with a position in the virtual space by association with an object, for example a virtual visual object, in the virtual visual space. In this example, the sound source is indirectly associated with a position of the associated object in the virtual space.

Sound sources 94 may be grouped to form a group because they are spatially clustered.

Sound sources 94 may be grouped to form a group because they are interactive sound sources that have, for example, co-ordinated sounds.

The arrangement of virtual partitions 240 divides the virtual space 90,20 and affects perception of the virtual space 90,20 by a virtual user 16 within the virtual space 90,20. The arrangement of virtual partitions 240 is based on the groups. Each group becomes a separate sound scene 92 separated from other sound scenes 92 by one or more virtual partitions 240.

The grouping of the sound sources may be dynamically varied. The arrangement of virtual partitions 240 based on the groups may, as a consequence, be dynamically varied. For example, the groupings may be dependent upon a position of the user 16 within the virtual space 90, 20.

For example, the merging of groups to form a new replacement group may occur as a virtual user 16 moves away from the groups and the relative separation between a position of the user in virtual space 90,20 and a position associated with the groups of sound sources 94 increases. In this way, spatial resolution of the groups decreases.

For example, the division of a group to form multiple groups may occur as a virtual user 16 moves towards the group and the relative separation between a position of the virtual user 16 in virtual space 90,20 and a position associated with the group of sound sources 94 decreases. In this way, the spatial resolution of the groups increases.

In some examples, the user 18 may control the formation of groups by for example identifying virtual visual objects or sound objects that should define separated groups.

FIG. 18D is similar to FIG. 18C, except that in this example the sound scenes are not necessarily contiguous and no not cover all of the virtual space. There are undefined areas 96 that do not fall within a sound scene 92. If the virtual user 16 enters an undefined area 96, then all the virtual partitions 240 are removed until the virtual user 16 leaves the undefined area 96 and enters a sound scene 92 in which case the virtual partitions 240 return.

The methods as described with reference to FIGS. 11 to 18 may be performed by any suitable apparatus (e.g. apparatus 30, 400), computer program (e.g. computer program 46, 416) or system (e.g. system 100) such as those previously described or similar.

In the foregoing examples, reference has been made to a computer program or computer programs. A computer program, for example either of the computer programs 48, 416 or a combination of the computer programs 48, 416 may be configured to perform the method 100.

Also as an example, an apparatus 30, 400 may comprises: at least one processor 40, 412; and at least one memory 46, 414 including computer program code the at least one memory 46, 414 and the computer program code configured to, with the at least one processor 40, 412, cause the apparatus 400, 20 at least to perform: causing division of a virtual space using virtual partitions 240 that affect perception of the virtual space by a user 18 having a virtual position within the virtual space; in response to a first action 210 in the virtual space relative to a first virtual partition 240 by a real user 18 making a first change to how the first virtual partition 240 affects the virtual space perceived by the user 18.

The computer program 48, 416 may arrive at the apparatus 30,400 via any suitable delivery mechanism. The delivery mechanism may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 48, 416. The delivery mechanism may be a signal configured to reliably transfer the computer program 48, 416. The apparatus 30, 400 may propagate or transmit the computer program 48, 416 as a computer data signal. FIG. 10 illustrates a delivery mechanism 430 for a computer program 416.

It will be appreciated from the foregoing that the various methods 600 described may be performed by an apparatus 30, 400, for example an electronic apparatus 30, 400.

The electronic apparatus 30, 400 may in some examples be a part of an audio output device 300 such as a head-mounted audio output device or a module for such an audio output device 300. The electronic apparatus 30, 400 may in some examples additionally or alternatively be a part of a head-mounted apparatus 33 comprising the rendering device(s) 32 that renders information to a user visually and/or aurally and/or haptically.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

The blocks, steps and processes illustrated in the FIGS. 11-18 may represent steps in a method and/or sections of code in the computer program. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

As used here 'module' refers to a unit or apparatus that excludes certain parts/components that would be added by an end manufacturer or a user. The controller 42 or controller 410 may, for example be a module. The apparatus may be a module. The rendering devices 32 may be a module or separate modules.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An apparatus comprising:
   at least one processor; and
   at least one non-transitory memory comprising computer program code,
   the at least one memory and the computer program code configured to, with the at least one processor, cause the apparatus to perform at least the following:
      divide a virtual space, using one or more virtual partitions, into a plurality of scenes, wherein the one or more virtual partitions affect rendering of the virtual space to affect perception of the virtual space by a user within the virtual space, wherein the one or more virtual partitions are configured to control audibility of at least one sound object located in the virtual space; and
      in response to a first user action in the virtual space relative to at least a first virtual partition of the one or more virtual partitions, make a first change to how at least the first virtual partition affects perception of the at least one sound object by the user.

2. The apparatus of claim 1, wherein the one or more virtual partitions define the plurality of scenes demarcated at least partly with the one or more virtual partitions, wherein a scene is at least partially audibly separated from an adjacent scene with at least one partition, and wherein each scene comprises different sound objects.

3. The apparatus of claim 2, wherein the at least one memory and the computer program code are configured to, with the at least one processor, cause the apparatus to:
   render audio associated with a current scene to the user at a greater volume than audio associated with any other scene, wherein the current scene is determined based, at least partially, on a position of the user in the virtual space, the current scene being a scene within which the user is currently located.

4. The apparatus of claim 3, wherein the at least one memory and the computer program code are configured to, with the at least one processor, cause the apparatus to:
   render audio associated with a first scene different to the current scene to the user at an increased volume in dependence upon an increased user proximity to a virtual partition dividing the current scene from the first scene.

5. The apparatus of claim 3, wherein the at least one memory and the computer program code are configured to, with the at least one processor, cause the apparatus to:
   control attenuation of audio associated with scenes other than the current scene during rendering of audio to the user, and
   change attenuation of the audio associated with the scenes other than the current scene in dependence upon a user relationship to the one or more virtual partitions, comprising reducing attenuation of audio associated with a first scene in dependence upon user proximity to a virtual partition dividing the first scene from the current scene.

6. The apparatus of claim 1, wherein the at least one memory and the computer program code are configured to, with the at least one processor, cause the apparatus to:
   automatically undo the first change to how the first virtual partition affects the perception of the at least one sound object by the user, in an absence of continuation of the first user action.

7. The apparatus of claim 1, wherein the at least one memory and the computer program code are configured to, with the at least one processor, cause the apparatus to, in response to a second user action at least partially different to the first user action, remove an effect of the first user action to the first virtual partition on the virtual space perceived by the user, comprising undoing the first change to how at least the first virtual partition affects the perception of the at least one sound object by the user.

8. The apparatus of claim 1, wherein the at least one memory and the computer program code are configured to, with the at least one processor, cause the apparatus to:
   cause confirmatory haptic feedback via a haptic device to the user after the user performs the first user action in the virtual space to confirm that the first user action causes the first change to how at least the first virtual partition affects the perception of the at least one sound object by the user.

9. The apparatus of claim 1, wherein the at least one memory and the computer program code are configured to, with the at least one processor, cause the apparatus to:
   dynamically change division of the virtual space using the one or more virtual partitions that affect perception of the virtual space by the user within the virtual space.

10. The apparatus of claim 1, wherein the at least one memory and the computer program code are configured to, with the at least one processor, cause the apparatus to:
    determine division of the virtual space using the one or more virtual partitions that affect perception of the virtual space by the user within the virtual space, comprising grouping sound sources.

11. The apparatus of claim 10, wherein grouping the sound sources is dependent upon a relative separation between a position of the user in the virtual space and a position associated with a respective sound source of the sound sources.

12. The apparatus of claim 1, wherein the at least one memory and the computer program code are configured to, with the at least one processor, cause the apparatus to:
    determine division of the virtual space using the one or more virtual partitions that affect perception of the virtual space by the user within the virtual space, comprising locating the one or more virtual partitions in dependence upon corresponding positions, within the virtual space, of capturing devices used to capture video and/or audio content defining the virtual space.

13. The apparatus of claim 1, wherein the at least one memory and the computer program code are configured to, with the at least one processor, cause the apparatus to:
    render visual indications in the virtual space in association with the one or more virtual partitions that visually identify the one or more virtual partitions to the user in the virtual space.

14. A method comprising:
    dividing a virtual space, using one or more virtual partitions, into a plurality of scenes, wherein the one or more virtual partitions affect rendering of the virtual space to affect perception of the virtual space by a user within the virtual space, wherein the one or more virtual partitions are configured to control audibility of at least one sound object located in the virtual space; and
    in response to a first user action in the virtual space relative to at least a first virtual partition of the one or more virtual partitions, making a first change to how at least the first virtual partition affects perception of the at least one sound object by the user.

15. A method as claimed in claim 14, wherein the one or more virtual partitions define a plurality of scenes demarcated at least partly with the one or more virtual partitions, wherein a scene is at least partially audibly separated from an adjacent scene with at least one partition, and wherein each scene comprises different sound objects.

16. A method as claimed in claim 15, comprising rendering audio associated with a current scene to the user at a greater volume than audio associated with any other scene, wherein the current scene is determined based, at least partially, on a position of the user in the virtual space, the current scene being a scene within which the user is currently located.

17. A method as claimed in claim 16, comprising rendering audio associated with a first scene different to the current scene to the user at an increased volume in dependence upon an increased user proximity to a virtual partition dividing the current scene from the first scene.

18. A method as claimed in claim 16, comprising controlling attenuation of audio associated with scenes other than the current scene during rendering of audio to the user, and changing attenuation of the audio associated with the scenes other than the current scene in dependence upon a user relationship to the one or more virtual partitions, comprising reducing attenuation of audio associated with a first scene in dependence upon user proximity to a virtual partition dividing the first scene from the current scene.

19. A method as claimed in claim 14, further comprising automatically undoing the first change to how the first virtual partition affects the perception of the at least one sound object by the user, in an absence of continuation of the first user action.

20. A non-transitory computer readable medium comprising program instructions stored thereon for performing at least the following:
  divide a virtual space, using one or more virtual partitions into a plurality of scenes, wherein the one or more virtual partitions affect rendering of the virtual space to affect perception of the virtual space by a user within the virtual space, wherein the one or more virtual partitions are configured to control audibility of at least one sound object located in the virtual space; and
  in response to a first user action in the virtual space relative to at least a first virtual partition of the one or more virtual partitions, make a first change to how at least the first virtual partition affects perception of the at least one sound object by the user.

* * * * *